US006872326B2

(12) United States Patent
Arai et al.

(10) Patent No.: US 6,872,326 B2
(45) Date of Patent: Mar. 29, 2005

(54) METHOD OF MANUFACTURING MAGNETIC POWDER, MAGNETIC POWDER AND BONDED MAGNETS

(75) Inventors: Akira Arai, Shimosuwa-machi (JP); Hiroshi Kato, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/373,973

(22) Filed: Feb. 25, 2003

(65) Prior Publication Data

US 2003/0213532 A1 Nov. 20, 2003

Related U.S. Application Data

(62) Division of application No. 09/919,242, filed on Jul. 31, 2001, now Pat. No. 6,554,913.

(30) Foreign Application Priority Data

Jul. 31, 2000 (JP) ....................................... 2000-232488

(51) Int. Cl.$^7$ .......................... C04B 35/04; H01F 1/057

(52) U.S. Cl. ...................... 252/62.54; 148/302; 75/255; 428/600; 428/606; 428/687

(58) Field of Search ................................ 428/600, 606, 428/687; 148/302; 75/255; 252/62.54, 62.55

(56) References Cited

U.S. PATENT DOCUMENTS

| | | | | |
|---|---|---|---|---|
| 4,212,343 | A | 7/1980 | Narasimhan | |
| 4,408,653 | A | 10/1983 | Nienart et al. | |
| 4,705,095 | A | 11/1987 | Gaspar | |
| 4,819,712 | A | 4/1989 | Bartlett | |
| 4,903,751 | A | 2/1990 | Hackman | |
| 4,934,443 | A | 6/1990 | Honeycutt et al. | |
| 5,665,177 | A | 9/1997 | Fukuno et al. | |
| 5,993,939 | A * | 11/1999 | Fukuno et al. | 428/167 |
| 6,648,989 | B2 * | 11/2003 | Arai et al. | 148/302 |

FOREIGN PATENT DOCUMENTS

| | | | |
|---|---|---|---|
| EP | 0 52901480 | A2 * | 3/1993 |
| EP | 0 936 633 | | 8/1999 |
| EP | 2000077219 | | 3/2000 |
| JP | 62-290857 | | 12/1987 |
| JP | 64-042501 | | 2/1989 |
| JP | 02-165849 | | 6/1990 |
| JP | 05-062813 | | 3/1993 |
| JP | 05-269549 | | 10/1993 |

(Continued)

OTHER PUBLICATIONS

Search Report for corresponding European Application No. 01118452.0.

*Primary Examiner*—John P Sheehan
(74) *Attorney, Agent, or Firm*—Harness, Dickey & Pierce, P.L.C.

(57) ABSTRACT

A method of manufacturing magnetic powder is disclosed. This method can provide magnetic powder from which a bonded magnet having excellent magnetic properties and reliability can be manufactured. A melt spinning apparatus 1 is provided with a tube 2 having a nozzle 3 at the bottom thereof, a coil 4 for heating the tube and a cooling roll 5. The cooling roll 5 is constructed from a roll base 51 and a circumferential surface 53 in which gas flow passages 54 for expelling gas are formed. A melt spun ribbon 8 is formed by injecting the molten alloy 6 from the nozzle 3 so as to be collided with the circumferential surface 53 of the cooling roll 5, so that the molten alloy 6 is cooled and then solidified. In this process, gas is likely to enter between a puddle 7 of the molten alloy 6 and the circumferential surface 53, but such gas is expelled by means of the gas flow passages 54. The magnetic powder is obtained by milling thus formed melt spun ribbon 8. In this method, when the average pitch of these gas flow passages 54 is defined as P$\mu$m and the average particle size of the magnetic powder is defined as D$\mu$m, the relationship represented by the formula P<D is satisfied.

12 Claims, 18 Drawing Sheets

FOREIGN PATENT DOCUMENTS

| | | | |
|---|---|---|---|
| JP | 5-269549 | | 10/1993 |
| JP | 05-337611 | | 12/1993 |
| JP | 08-215801 | | 8/1996 |
| JP | 08-176648 | | 9/1996 |
| JP | 09-271909 | * | 10/1997 |
| JP | 10-041114 | | 2/1998 |
| JP | 10-317110 | | 12/1998 |
| JP | 11-309549 | * | 11/1999 |
| JP | 2000-077219 | | 3/2000 |
| JP | 2000-182814 | | 6/2000 |
| JP | 2000-345313 | | 12/2000 |
| JP | 2001-353560 | | 12/2001 |
| JP | 2001-358004 | | 12/2001 |
| JP | 2002-035899 | | 2/2002 |

* cited by examiner

PRIOR ART

METHOD OF MANUFACTURING MAGNETIC POWDER, MAGNETIC POWDER AND BONDED MAGNETS

This application is a divisional of application Ser. No. 09/919,242, filed Jul. 31, 2001 and now U.S. Pat. No. 6,554,913.

BACKGROUND OF THE INVENTION

1. Field of the Invention

The present invention relates to a method of manufacturing magnetic powder, magnetic powder and bonded magnets. More specifically, the present invention relates to a method of manufacturing magnetic powder, magnetic powder manufactured by the method, and a bonded magnet manufactured using the magnetic powder.

2. Description of the Prior Art

Rare-earth magnetic materials formed from alloys containing rare-earth elements have high magnetic properties. Therefore, when they are used for magnetic materials for motors, for example, the motors can exhibit high performance.

Such magnetic materials are normally manufactured by the quenching method using a melt spinning apparatus, for example. Hereinbelow, a description will be made with regard to the manufacturing method using the melt spinning apparatus.

FIG. 21 is a sectional side view which shows the situation caused at or around a colliding section of a molten alloy with a cooling roll in the conventional melt spinning apparatus which manufactures a magnetic material by means of a single roll method.

As shown in this figure, in the conventional method, a magnetic material of a predetermined alloy composition (hereinafter, referred to as "alloy" is melt and such a molten alloy 60 is injected from a nozzle (not shown in the drawing) so as to be collided with a circumferential surface 530 of a cooling roll 500 which is rotating relative to the nozzle in the direction indicated by the arrow A in FIG. 21. The alloy which is collided with the circumferential surface 530 is rapidly cooled down (quenched) to be solidified, thereby producing a ribbon-shaped magnetic material (that is, a melt spun ribbon 80) in a continuous manner. In this regard, it is to be noted that the dotted line in FIG. 21 indicates a solidification interface 710 of the molten alloy 60.

In the method described above, since the rare-earth elements are liable to oxidize and when they are oxidized the magnetic properties thereof tend to be lowered, the manufacturing of the melt spun ribbon 80 is normally carried out under an inert gas atmosphere.

However, this causes the case that gas enters between the circumferential surface 530 and the puddle 70 of the molten alloy 60, which results in formation of dimples (depressions) 9 in the roll contact surface 810 of the melt spun ribbon 80 (that is, the surface of the melt spun ribbon which is in contact with the circumferential surface 530 of the cooling roll 500). This tendency becomes prominent as the peripheral velocity of the cooling roll 500 becomes large, and in such a case the area occupied by thus formed dimples also becomes larger.

In the case where such dimples 9 (especially, huge dimples) are formed, the molten alloy 60 can not sufficiently contact with the circumferential surface 530 of the cooling roll 500 at the locations of the dimples due to the existence of the entered gas, so that the cooling rate is lowered to prevent rapid solidification. As a result, at portions of the melt spun ribbon where such dimples are formed, the crystal grain size of the alloy becomes coarse, which results in lowered magnetic properties.

Magnetic powder obtained by milling such a melt spun ribbon having the portions of the lowered magnetic properties has larger dispersion or variation in its magnetic properties. Therefore, bonded magnets formed from such magnetic powder can have only poor magnetic properties, and corrosion resistance thereof is also lowered.

SUMMARY OF THE INVENTION

In view of the above problem involved in the prior art, it is an object of the present invention to provide a method of manufacturing magnetic powder which can provide bonded magnets having excellent magnetic properties and reliability. Further, it is also an object of the present invention to provide magnetic powder and bonded magnets having excellent magnetic properties and reliability.

In order to achieve the above object, the present invention is directed to a method of manufacturing magnetic powder in which the magnetic powder is manufactured by milling a ribbon-shaped magnetic material which has been obtained by colliding a molten alloy of a magnetic material to a circumferential surface of a rotating cooling roll so as to cool and then solidify it. This method is characterized in that the cooling roll is formed with gas flow passages as gas expelling means for expelling gas entered between the circumferential surface and a puddle of the molten alloy in the circumferential surface thereof, and, when the average pitch of these gas flow passages is defined as P$\mu$m and the average particle size of the magnetic powder is defined as D$\mu$m, the relationship represented by the formula $P<D$ is satisfied.

According to the above described manufacturing method, it is possible to provide magnetic powder from which bonded magnets having excellent magnetic properties and reliability can be manufactured.

In this method, it is preferred that the average particle size of the magnetic powder lies in the range of 5 to 300 $\mu$m. This makes it possible to provide bonded magnets having especially excellent magnetic properties.

Further, it is also preferred that the average pitch P of the gas flow passages lies in the range of 0.5 $\mu$m or more and less than 100 $\mu$m. When such a cooling roll is used, dispersion in the cooling rates of the molten alloy can be made small irrespective of the contacting portions of molten alloy with the cooling roll, and, as a result thereof, it is possible to provide bonded magnets having especially excellent magnetic properties.

Furthermore, it is also preferred that the average width of the gas flow passages lies in the range of 0.5 to 90 $\mu$m. When such a cooling roll is used, gas that entered between the puddle of the molten alloy and the circumferential surface of the cooling roll can be effectively expelled through the passages, and, as a result thereof, it is possible to provide bonded magnets having especially excellent magnetic properties.

Moreover, it is also preferred that the average depth of the gas flow passages lies in the range of 0.5 to 20 $\mu$m. When such a cooling roll is used, it is also possible to expel gas that entered between the puddle of the molten alloy and the circumferential surface of the cooling roll effectively through the passages, and, as a result thereof, it is possible to provide bonded magnets having especially excellent magnetic properties.

Further, in a preferred form of this method, when the average width of the gas flow passages is defined as $L_1$ and the average depth of the gas flow passages is defined as $L_2$, the relationship represented by the formula of $0.5 \leqq L_1/L_2 \leqq 15$ is satisfied. Use of such a cooling roll also makes it possible to expel gas that entered between the puddle of the molten alloy and the circumferential surface of the cooling roll effectively through the passages, so that it is possible to provide bonded magnets having especially excellent magnetic properties.

In this method, it is preferred that the cooling roll includes a roll base and an outer surface layer provided on an outer peripheral portion of the roll base, and the gas flow passages are provided in the outer surface layer. Use of such a cooling roll also makes it possible to provide bonded magnets having excellent magnetic properties and reliability.

In this case, it is preferred that the outer surface layer of the cooling roll is formed of a material having heat conductivity lower than the heat conductivity of the structural material of the roll base at or around a room temperature. This makes it possible to quench the molten alloy of the magnetic material with an appropriate cooling rate, thereby enabling to provide bonded magnets having especially excellent magnetic properties.

Further, it is also preferred that the heat conductivity of the outer surface layer of the cooling roll at or around a room temperature is equal to or less than $80 W\ m^{-1}\ K^{-1}$. This also makes it possible to quench the molten alloy of the magnetic material with an appropriate cooling rate, so that it is possible to provide bonded magnets having especially excellent magnetic properties.

Preferably, the outer surface layer of the cooling roll is formed of a ceramics. This also makes it possible to quench the molten alloy of the magnetic material with an appropriate cooling rate, thereby enabling to provide bonded magnets having especially excellent magnetic properties. Further, the durability of the cooling roll is also improved.

Further, it is preferred that the thickness of the outer surface layer of the cooling roll is 0.5 to 50 μm. This also makes it possible to quench the molten alloy of the magnetic material with an appropriate cooling rate, so that it is possible to provide bonded magnets having especially excellent magnetic properties.

In this method, it is also preferred that the outer surface layer of the cooling roll is manufactured without experience of machining process. Namely, according to the present invention, the surface roughness Ra of the circumferential surface of the cooling roll can be made small without machining process such as grinding or polishing.

Further, in this method, it is also preferred that the angle defined by the longitudinal direction of the gas flow passages and the rotational direction of the cooling roll is equal to or less than 30 degrees. This also makes it possible to effectively expel the gas that has entered between the puddle and the circumferential surface of the cooling roll, so that it becomes possible to manufacture bonded magnets having especially excellent magnetic properties.

Furthermore, it is also preferred that the gas flow passages are formed spirally with respect to the rotation axis of the cooling roll. According to such a structure, it is possible to form the cooling roll with the recesses relatively easily. Further, this also makes it possible to effectively expel the gas that has entered between the puddle and the circumferential surface of the cooling roll, so that it becomes possible to provide bonded magnets having especially excellent magnetic properties.

Moreover, it is also preferred that each gas flow passage has openings located at the peripheral edges of the circumferential surface. This makes it possible to effectively prevent the gas that has once expelled from reentering between the puddle and the circumferential surface again, so that it becomes possible to manufacture bonded magnets having especially excellent magnetic properties.

Further, in this method, it is preferred that the ratio of the projected area of the gas flow passages with respect to the projected area of the circumferential surface is in the range of 10–99.5%. This makes it possible to quench the molten alloy of the magnetic material with an appropriate cooling rate, so that it is possible to provide bonded magnets having especially excellent magnetic properties.

Furthermore, in this method, it is also preferred that the shape of the circumferential surface of the cooling roll is transferred to at least a part of the roll contact surface of the ribbon-shaped magnetic material. According to this method, it is possible to obtain magnetic powder which can provide good binding with the binding resin. Namely, it is possible to obtain magnetic powder which is suited for manufacturing bonded magnets having high mechanical strength and excellent magnetic properties and corrosion resistance.

Another aspect of the present invention is directed to magnetic powder which is manufactured according to the manufacturing method as described above. This magnetic powder can provide bonded magnets having excellent magnetic properties and reliability.

In the present invention, it is preferred that the magnetic powder contains particles each of which is formed with a plurality of recesses or ridges in at least a part of its surface. This makes it possible to provide magnetic powder having good binding force with the binding resin. As a result, this magnetic powder is suited f or manufacturing bonded magnets having high mechanical strength and excellent magnetic properties and corrosion resistance.

In this case, it is preferred that the average diameter of the particles of the magnetic powder is defined as Dμm, the average length of the ridges or recesses is equal to or greater than D/40 μm. This also makes it possible to provide magnetic powder having good binding force with the binding resin. As a result, this magnetic powder is also suited for manufacturing bonded magnets having high mechanical strength and excellent magnetic properties and corrosion resistance.

Further, it is also preferred that the average height of the ridges or the average depth of the recesses is in the range of 0.1 to 10 μm. This also makes it possible to provide magnetic powder having good binding force with the binding resin. As a result, this magnetic powder is also suited for manufacturing bonded magnets having high mechanical strength and especially excellent magnetic properties and corrosion resistance.

Furthermore, it is also preferred that the ridges or recesses are formed in parallel with each other, in which the average pitch of the adjacent ridges or recesses is in the range of 0.5 to 100 μm. This also makes it possible to provide magnetic powder having good binding force with the binding resin. As a result, this magnetic powder is also suited for manufacturing bonded magnets having high mechanical strength and especially excellent magnetic properties and corrosion resistance.

Moreover, it is also preferred that the ratio of an area of a portion of the particle where the ridges or recesses are formed with respect to the total surface area of the particle is equal to or greater than 15%. This also makes it possible to provide magnetic powder having good binding force with the binding resin. As a result, this magnetic powder is also suited for manufacturing bonded magnets having high mechanical strength and especially excellent magnetic properties and corrosion resistance.

In the magnetic powder of the present invention, it is preferred that the average particle size of the magnetic powder is in the range of 5 to 300 $\mu$m. Use of the magnetic powder containing such particles makes it possible to provide bonded magnets having more excellent magnetic properties.

Further, in the magnetic powder of the present invention, it is also preferred that the magnetic powder is subjected to at least one heat treatment during or after the manufacturing process thereof. This also makes it possible to provide bonded magnets having more excellent magnetic properties.

Preferably, the magnetic powder of the present invention has a composite structure composed of a hard magnetic phase and a soft magnetic phase. This makes it possible to provide magnets having especially excellent magnetic properties.

In this case, it is preferred that the average crystal grain size of each of the hard magnetic phase and the soft magnetic phase is in the range of 1–100 nm. This also makes it possible to provide magnets having excellent magnetic properties, especially excellent coercive force and rectangularity.

Other aspect of the present invention is directed to a bonded magnet which is manufactured by binding the magnetic powder as described above with a binding resin. These bonded magnets have excellent magnetic properties and reliability.

Further, yet other aspect of the present invention is also directed to a bonded magnet which is manufactured by binding the magnetic powder described above with a binding resin, wherein the binding resin enters between the ridges or into the recesses. These bonded magnets have more excellent magnetic properties and reliability.

Preferably, the bonded magnet is manufactured by a warm molding. By using this molding method, the magnetic powder can be bonded with the binding resin more reliably. As a result, it is possible to easily provide bonded magnets having low void ratio and having especially excellent mechanical strength, magnetic properties and corrosion resistance.

In the bonded magnet of the present invention, it is preferred that the intrinsic coercive force ($H_{CJ}$) of the bonded magnet at a room temperature lies within the range of 320–1200 kA/m. This makes it possible to provide bonded magnets having excellent heat resistance and magnetizability as well as sufficient magnetic flux density.

Further, it is also preferred that the maximum magnetic energy product $(BH)_{max}$ of the bonded magnet is equal to or greater than 40 kJ/$m^3$. By using such a bonded magnet, it is possible to provide high performance small size motors.

Furthermore, it is also preferred that the content of the magnetic powered contained in the bonded magnet is in the range of 75 to 99.5 wt %. The bonded magnets containing the magnetic powder of this amount can have especially excellent mechanical strength, magnetic properties and corrosion resistance.

Moreover, it is also preferred that the mechanical strength of the bonded magnet which is measured by the shear strength by punching-out test is equal to or greater than 50 MPa. This bonded magnet can have especially excellent mechanical strength.

These and other objects, structures and advantages of the present invention will be apparent from the following detailed description of the invention and the examples taken in conjunction with the appended drawings.

DETAILED DESCRIPTION OF THE INVENTION

Hereinbelow, embodiments of the manufacturing method according to the present invention as well as embodiments of the magnetic powder and bonded magnet according to the present invention will be described in detail.

Structure of Melt Spinning Apparatus

Figure 1:
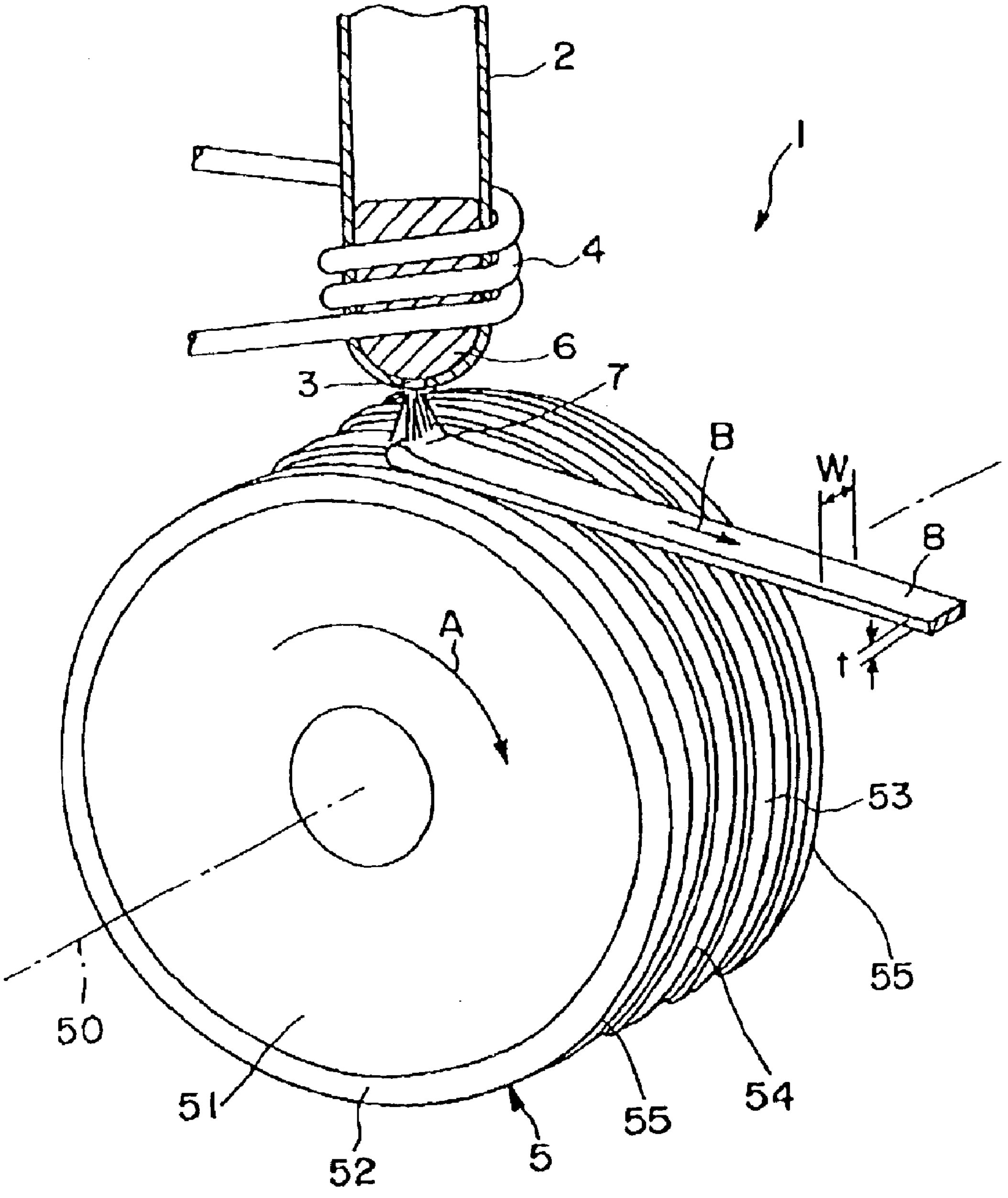
FIG. 1 is a perspective view which schematically shows an apparatus provided with a cooling roll (melt spinning apparatus) for manufacturing a ribbon-shaped magnetic material, which is used in a first embodiment of the manufacturing method of the present invention.
Figure 2:
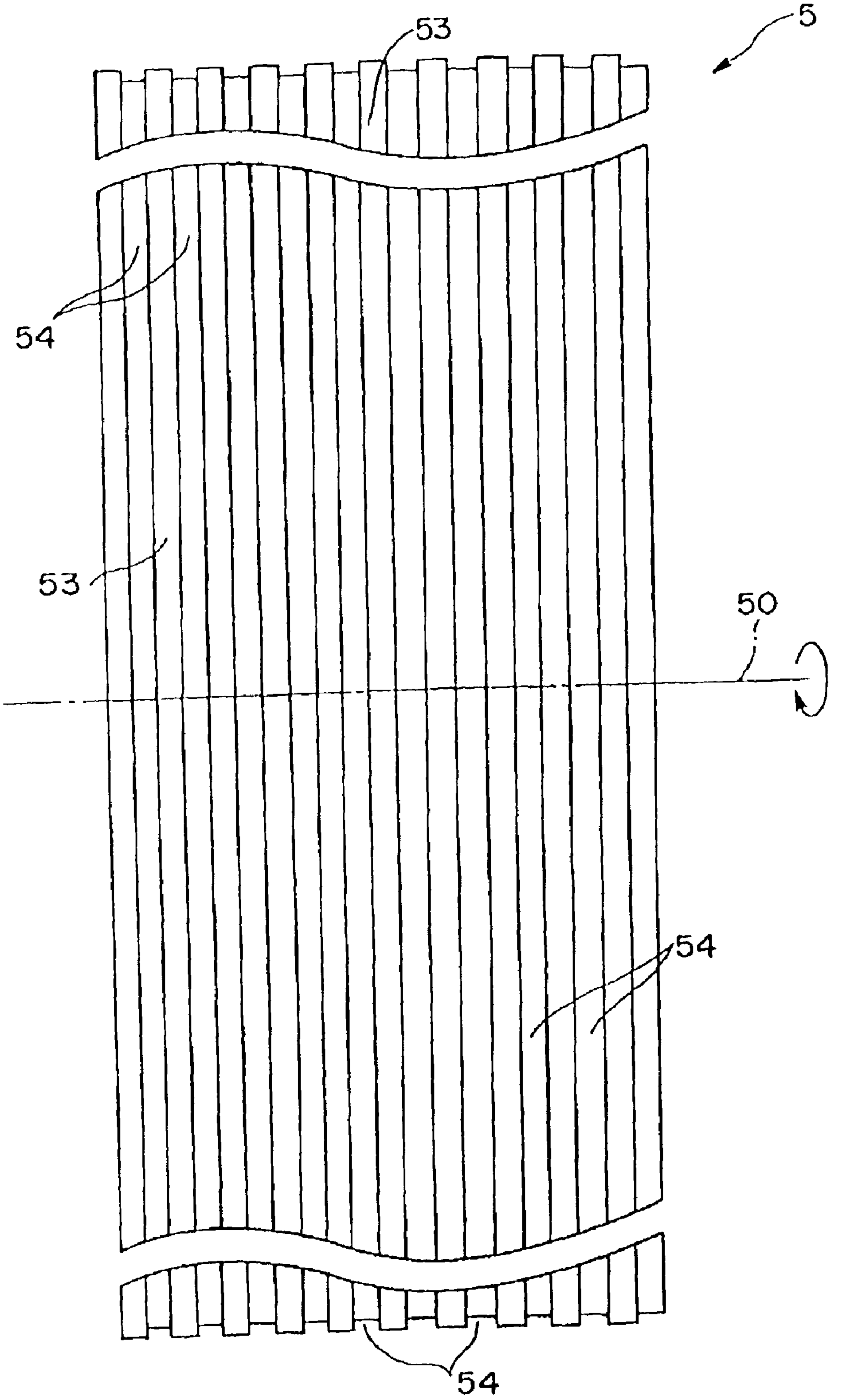
FIG. 2 is a front view of the cooling roll shown in FIG. 1.
Figure 3:
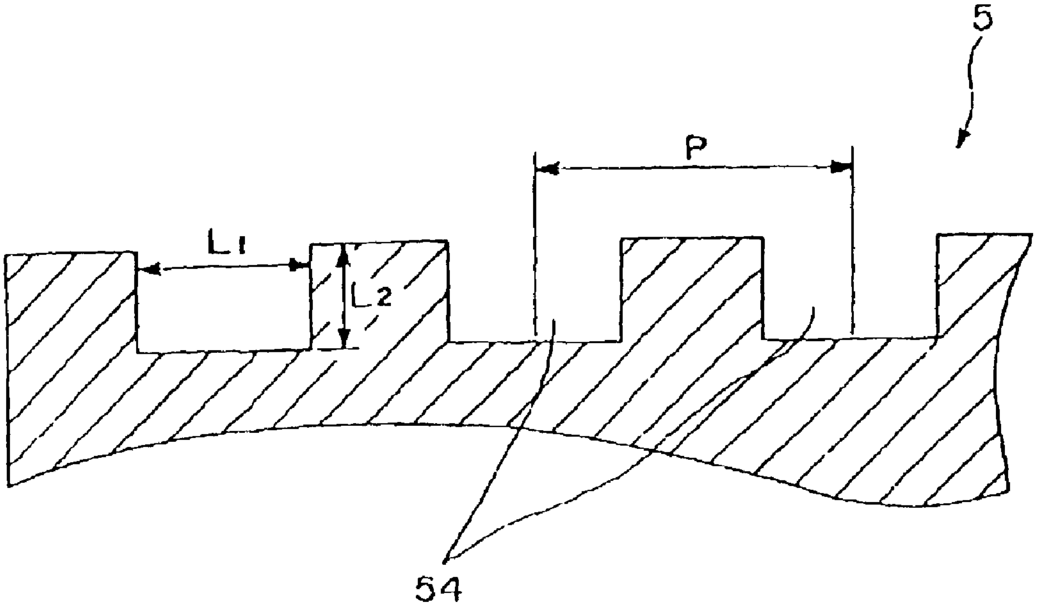
FIG. 3 is a sectional view which schematically shows the structure of a portion in the vicinity of the circumferential surface of the cooling roll shown in FIG. 1.

FIG. 1 is a perspective view showing an apparatus (a melt spinning apparatus) used in the first embodiment of the manufacturing method of the present invention, FIG. 2 is a front view of a cooling roll used in the melt spinning apparatus shown in FIG. 1, and FIG. 3 is an enlarged cross sectional view of a portion of the cooling roll shown in FIG. 2.

The magnetic powder of the present invention is obtained by milling a ribbon-shaped magnetic material (hereinafter, referred to as a "melt spun ribbon") which has been manufactured by the melt spinning apparatus as shown in FIG. 1. Therefore, a description will be first made with regard to the structure of the melt spinning apparatus.

As shown in FIG. 1, the melt spinning apparatus 1 includes a cylindrical body 2 capable of receiving a magnetic material, and a cooling roll 5 which rotates in the direction of an arrow A in the figure relative to the cylindrical body 2. A nozzle (orifice) 3 which injects a molten alloy 6 of a magnetic material is formed at the lower end of the cylindrical body 2.

The cylindrical body 2 may be formed of a heat resistance ceramic material such as crystal, alumina, magnesia and the like.

The nozzle opening of the nozzle 3 may be formed into various shapes such as circle, ellipse, slit and the like.

In addition, on the outer periphery of the cylindrical body 2 near from the nozzle 3 thereof, there is provided a heating coil 4. By applying high frequency wave to the coil 4, for example, the inside of the cylindrical body 2 is heated (inductively heated) and therefore the magnetic material in the cylindrical body 2 becomes a melting state.

In this regard, it is to be noted that the heating means used in this apparatus is not limited to the coil 4 described above, and a carbon heater may be employed instead of the coil 4, for example.

The cooling roll 5 is constructed from a roll base 51 and a surface layer 52 which constitutes a circumferential surface 53 of the cooling roll 5.

The material used for the roll base 51 is not limited to a specific material. However, in the present invention, it is preferred that the roll base 51 is formed of a metal material having high heat conductivity such as copper or copper alloys in order to make it possible to dissipate heat generated in the surface layer 52 as quickly as possible.

The surface layer 52 may be formed of the same material as that for the roll base 51. However, it is preferred that the surface layer 52 is formed of a material having lower heat conductivity than that of the material for the roll base 51. In this case, it is preferable that the heat conductivity of the structural material of the surface layer at or around a room temperature is equal to or less than $80 W \cdot m^{-1} K^{-1}$, it is more preferable that the heat conductivity lies within the range of 3 to $60 W \cdot m^{-1} K^{-1}$, and it is the most preferable that the heat conductivity lies within the range of 5 to $40 W \cdot m^{-1} \cdot K^{-1}$.

Examples of the materials having such heat conductivity include metal materials such as Zr, Sb, Ti, Ta, Pd, Pt and alloys of these metals, metallic oxides of these metals, and ceramics. Examples of the ceramics include oxide ceramics such as $Al_2O_3$, $SiO_2$, $TiO_2$, $Ti_2O_3$, $ZrO_2$ $Y_2O_3$, barium titanate, and strontium titanate and the like; nitride ceramics such as AlN, $Si_3N_4$, TiN, BN, ZrN, HfN, VN, TaN, NbN, CrN, $Cr_2N$ and the like; carbide ceramics such as graphite, SiC, ZrC, $Al_4C_3$, $CaC_2$, WC, TiC, HfC, VC, TaC, NbC and the like; and mixture of two or more of these ceramics. Among these ceramics, materials containing nitride ceramics are particularly preferred.

By constructing the cooling roll 5 from the surface layer 52 and the roll base 51 each having the heat conductivity as described above, it becomes possible to quench the molten alloy 6 in an appropriate cooling rate. Further, the difference between the cooling rates at the vicinity of the roll contact surface 81 (which is the surface of the melt spun ribbon to be in contact with the circumferential surface of the cooling roll) and at the vicinity of the free surface 82 (which is a surface of the melt spun ribbon opposite to the roll contact surface) becomes small. Consequently, it is possible to obtain a melt spun ribbon 8 having less dispersion in its crystal grain sizes at various portions thereof so as to have excellent magnetic properties. Accordingly, magnetic powder obtained by milling thus formed melt spun ribbon 8 is comprised of particles each having less dispersion in its crystal grain sizes, so that dispersion in their magnetic properties can be made small. As a result, it becomes possible for the magnetic powder to have excellent magnetic properties as a whole.

As compared with the conventional materials used for constituting the circumferential surface of the cooling roll (that is, Cu, Cr or the like), these ceramics have high hardness and excellent durability (anti-abrasion characteristic). Therefore, even if the cooling roll 5 is repeatedly used, the shape of the circumferential surface 53 can be maintained, and therefore the effect of the gas expelling means (described later) will be scarcely deteriorated.

Further, normally, the materials which can be used for the cooling roll 51 described above have high coefficient of thermal expansion. Therefore, it is preferred that the coefficient of thermal expansion of the material of the surface layer 52 is close to that of the material of the roll base 51. For example, the coefficient of thermal expansion (coefficient of linear expansion $\alpha$) at or around a room temperature is preferably in the range of 3.5 to $18[\times 10^{-6} K^{-1}]$, and more preferably in the range of 6 to $12[\times 10^{-6} K^{-1}]$. When the coefficient of thermal expansion of the material of the surface layer 52 at or around a room temperature (hereinafter, simply referred to as "coefficient of thermal expansion") lies within this range, it is possible to maintain reliable bonding between the roll base 51 and the surface layer 52, thereby enabling to prevent peeling-off of the surface layer 52 effectively.

The surface layer 52 may be formed into a laminate structure having a plurality of layers of different compositions, besides the single layer structure described above. In this case, it is preferred that these adjacent layers are well adhered or bonded to each other, and as an example of such a laminate structure, a laminate structure in which adjacent layers contain the same element therein can be mentioned.

Further, in the case where the surface layer 52 is formed into the single layer structure described above, it is not necessary for the composition of the material of the surface layer to have uniform distribution in the thickness direction thereof. For example, the contents of the constituents may be gradually changed in the thickness direction thereof (that is, graded materials may be used).

The average thickness of the surface layer 52 (in the case of the laminate structure, the total thickness thereof) is not limited to a specific value. However, it is preferred that the average thickness lies within the range of 0.5–50 $\mu$m, and more preferably 1–20 $\mu$m.

If the average thickness of the surface layer 52 is less than the lower limit value described above, there is a possibility that the following problems will be raised. Namely, depending on the material to be used for the surface layer 52, there is a case that cooling ability becomes too high. When such a material is used for the surface layer 52, a cooling rate becomes too large in the vicinity of the roll contact surface 81 of the melt spun ribbon 8 even though it has a considerably large thickness, thus resulting in the case that amorphous structure is liable to be produced at that portion. On the other hand, in the vicinity of the free surface 82 of the melt spun ribbon 8, the cooling rate becomes small as the thickness of the melt spun ribbon 8 increases, so that crystal grain size is liable to be coarse. Namely, the use of the cooling roll having the surface layer of which average thickness is less than the lower limit value leads to the case that the crystal grain size is liable to be coarse in the vicinity of the free surface 82 of the obtained melt spun ribbon 8 and that amorphous structure is liable to be produced in the vicinity of the roll contact surface 81 of the melt spun ribbon 8, which results in the case that satisfactory magnetic properties can not be obtained even if such a melt spun ribbon will be subjected to a heat treatment at the later stage. In this regard, even if the thickness of the melt spun ribbon 8 is made small by increasing the peripheral velocity of the cooling roll 5, for example, in order to reduce the crystal grain size in the vicinity of the free surface 82 of the melt spun ribbon 8, this in turn leads to the case that the melt spun ribbon 8 has more random amorphous structure in the vicinity of the roll contact surface 81 of the obtained melt spun ribbon 8. In such a melt spun ribbon 8, there is a case that sufficient magnetic properties can not be obtained even if it is subjected to a heat treatment after manufacturing thereof.

On the other hand, if the average thickness of the surface layer 52 exceeds the above upper limit value, the cooling rate becomes slow and thereby the crystal grain size becomes coarse, thus resulting in the case that magnetic properties become poor.

The method for forming the surface layer 52 is not limited to a specific method. However, it is preferable to employ a chemical vapor deposition (CVD) method such as heat CVD, plasma CVD, and laser CVD and the like, or a physical vapor deposition method (PVD) such as vapor deposition, spattering and ion-plating and the like. According to these methods, it is possible to obtain a surface layer having an uniform thickness with relative ease, so that it is not necessary to perform machining work onto the surface thereof after formation of the surface layer 52. Further, the surface layer 52 may be formed by means of other methods such as electro plating, immersion plating, elecroless plating, and metal spraying and the like. Among these methods, the metal spraying is particularly preferred. This is because when the surface layer 52 is formed by means of the metal spraying method, the surface layer 52 can be firmly adhered or bonded to the roll base 51.

Further, in the circumferential surface 53 of the cooling roll 5, there are provided gas flow passages (in the form of grooves) 54 which function as gas expelling means for expelling gas that has entered between the circumferential surface 53 and a puddle 7 of the molten alloy 6.

By expelling the gas from between the circumferential surface 53 and the puddle 7 by means of the gas expelling means (gas flow passages), the puddle 7 becomes capable of more reliably contacting with the circumferential surface 53 (this prevents formation of huge dimples). This means that differences in cooling rates at various portions of the puddle 7 become small, so that dispersion in the grain sizes (grain size distribution) of the obtained ribbon-shaped magnetic material 8 becomes also small. With this result, magnetic powder obtained by milling the melt spun ribbon 8 is comprised of or contains particles each having small dispersion in its crystal grain sizes, and therefore dispersion in its magnetic properties also becomes small. For these reasons, magnetic powder having excellent magnetic properties as a whole can be obtained.

By the provision of such gas expelling means, it is possible to enjoy synergistic effects together with the effect resulted from the surface layer 52 described above. As a result, the obtained melt spun ribbon 8 can have especially excellent magnetic properties with less dispersion at various portions thereof. Therefore, by using the melt spun ribbon 8, it is possible to obtain magnets having especially excellent magnetic properties.

In the example shown in the drawing, the gas flow passages (grooves) 54 are arranged substantially in parallel with the rotational direction of the cooling roll. By forming the gas flow passages so as to have such an arrangement as described above, gas which has been fed into the gas flow passages 54 can be expelled along the longitudinal direction of each gas flow passage 54. Therefore, gas which has entered between the circumferential surface 53 and the puddle 7 can be expelled with a particularly high efficiency, thus resulting in improved contact of the puddle 7 with the circumferential surface 53.

In this connection, it is to be understood that although the cooling roll shown in the drawings has a plurality of gas flow passages, at least one passage is sufficient in this invention.

The average value $L_1$ of the width of the gas flow passages 54 (at a portion opening to the circumferential surface 53) is preferably set to be 0.5–90 $\mu$m, more preferably 1–50 $\mu$m, and most preferably 3–25 $\mu$m. If the average width $L_1$ of the gas flow passages 54 is less than the smallest value, there is a case that gas which has entered between the circumferential surface 53 and the puddle 7 can not be sufficiently expelled. On the other hand, if the average width $L_1$ of the gas flow passages 54 exceeds the largest value, there is a case that the molten alloy 6 enters into the gas flow passages 54 so that the gas flow passages 54 will not function as the gas expelling means.

The average value $L_2$ of the depth (maximum depth) of the gas flow passages 54 is preferably set to be 0.5–20 $\mu$m, and more preferably 1–10 $\mu$m. If the average depth $L_2$ of the gas flow passages 54 is less than the smallest value, there is a case that gas which has entered between the circumferential surface 53 and the puddle 7 can not be sufficiently expelled. On the other hand, if the average depth $L_2$ of the gas flow passages 54 exceeds the largest value, the flow rate of the gas flowing in the gas flow passages increases so that the gas flow tends to be turbulent flow with eddies, which results in the case that huge dimples are liable to be formed in the roll contact surface of the melt spun ribbon 8.

In this connection, it is preferred that the average width $L_1$ of the gas flow passages 54 and the average depth $L_2$ of the gas flow passages 54 satisfy the following equation (I).

$$0.5 \leq L_1/L_2 \leq 15 \quad \text{(I)}$$

Further, instead of the equation (I), it is more preferable that the average width $L_1$ and the average depth $L_2$ satisfy the following equation (II), and it is further more preferable that they satisfy the following equation (III).

$$0.8 \leq L_1/L_2 \leq 10 \quad \text{(II)}$$

$$1 \leq L_1/L_2 \leq 8 \quad \text{(III)}$$

If the value of $L_1/L_2$ is less that the lowest value mentioned above, it becomes difficult to obtain an enough width of the gas flow passage to expel the gas, which results in the case that the gas entered between the circumferential surface 53 and the puddle 7 can not be expelled sufficiently. Further, in this condition, since the average depth $L_2$ of the gas flow passages 54 also becomes large relatively, the flow rate of the gas flowing in the gas flow passages 54 increases so that the gas flow is liable to be turbulent flow with eddies, which results in the case that huge dimples are liable to be formed in the roll contact surface of the melt spun ribbon 8.

On the other hand, if the value of $L_1/L_2$ exceeds the largest value mentioned above, there is a case that the molten alloy 6 enters the gas flow passages 54 so that the gas flow passages do not exhibit function as the gas expelling means sufficiently. Further, since the average depth $L_2$ of the gas flow passages 54 also becomes small relatively, which results in the case the gas which has entered between the circumferential surface 53 and the puddle 7 can not be expelled sufficiently.

In addition to the above, in the present invention, the average pitch P[$\mu$m] of the adjacent gas flow passages arranged in parallel with each other should satisfy the following relationship with respect to the average particle size (diameter) D[$\mu$m] of the particles of the magnetic powder (which will be described later in more detail with reference to the section entitled as "Manufacture of Magnetic Powder").

$P<D$

The average pitch P of the adjacent gas flow passages 54 is not limited to a particular value. But it is preferable that the average pitch is in the range of 0.5–100 $\mu$m, and it is more preferable that it is in the range of 3–50 $\mu$m. If the average pitch is within these ranges, each gas flow passage 54 effectively functions as the gas expelling means, and the interval between the contacting portion and the non-contacting portion of the puddle 7 with respect to the circumferential surface 53 can be made sufficiently small. With this result, the difference in the cooling rates at the contacting portion and the non-contacting portion becomes sufficiently small, so that it is possible to obtain a melt spun ribbon 8 having small dispersion in its grain sizes and magnetic properties. In particular, when the surface layer 52 is made of the ceramics as described above, deterioration of the surface condition of the surface layer 52 such as abrasion or chipping of the surface layer will hardly occur even if the gas flow passages 54 with the small pitch therebetween are formed in the surface layer 52. Therefore, even if the cooling roll 5 is repeatedly used, the effect of the gas expelling means can be maintained.

The ratio of the area of the gas flow passages 54 with respect to the area of the circumferential surface 53 when they are projected on the same plane is preferably set to be 10–99.5%, and more preferably 30–95%. If the ratio of the projected area of the gas flow passages with respect to the projected area of the circumferential surface 53 is less than the lower limit value, the cooling rate of the melt spun ribbon 8 in the vicinity of its roll contact surface 81 thereof becomes large so that such a portion is liable to have an amorphous structure. Further, in the vicinity of the free surface 82 of the melt spun ribbon 8, the crystal grain size becomes coarse due to the relatively lower cooling rate therein as compared with that in the vicinity of the roll contact surface 81, thus leading to the case that magnetic properties are lowered. On the other hand, if the ratio of the projected area of the gas flow passages with respect to the projected area of the circumferential surface 53 exceeds the upper limit value, the cooling rate becomes small so that the crystal grain size becomes coarse, thus leading to the case that magnetic properties become poor.

Further, by the formation of such grooves (gas flow passages 54), the firm bonding between the roll base 51 and the surface layer 52 can be maintained even in the case where the difference between the heat conductivity of the roll base 51 and the heat conductivity of the surface layer 52 is considerably large, so that occurrence of peeling off of the surface layer 52 from the roll base 51 can be prevented effectively. This is supposed to result from the following reasons.

Figure 4:
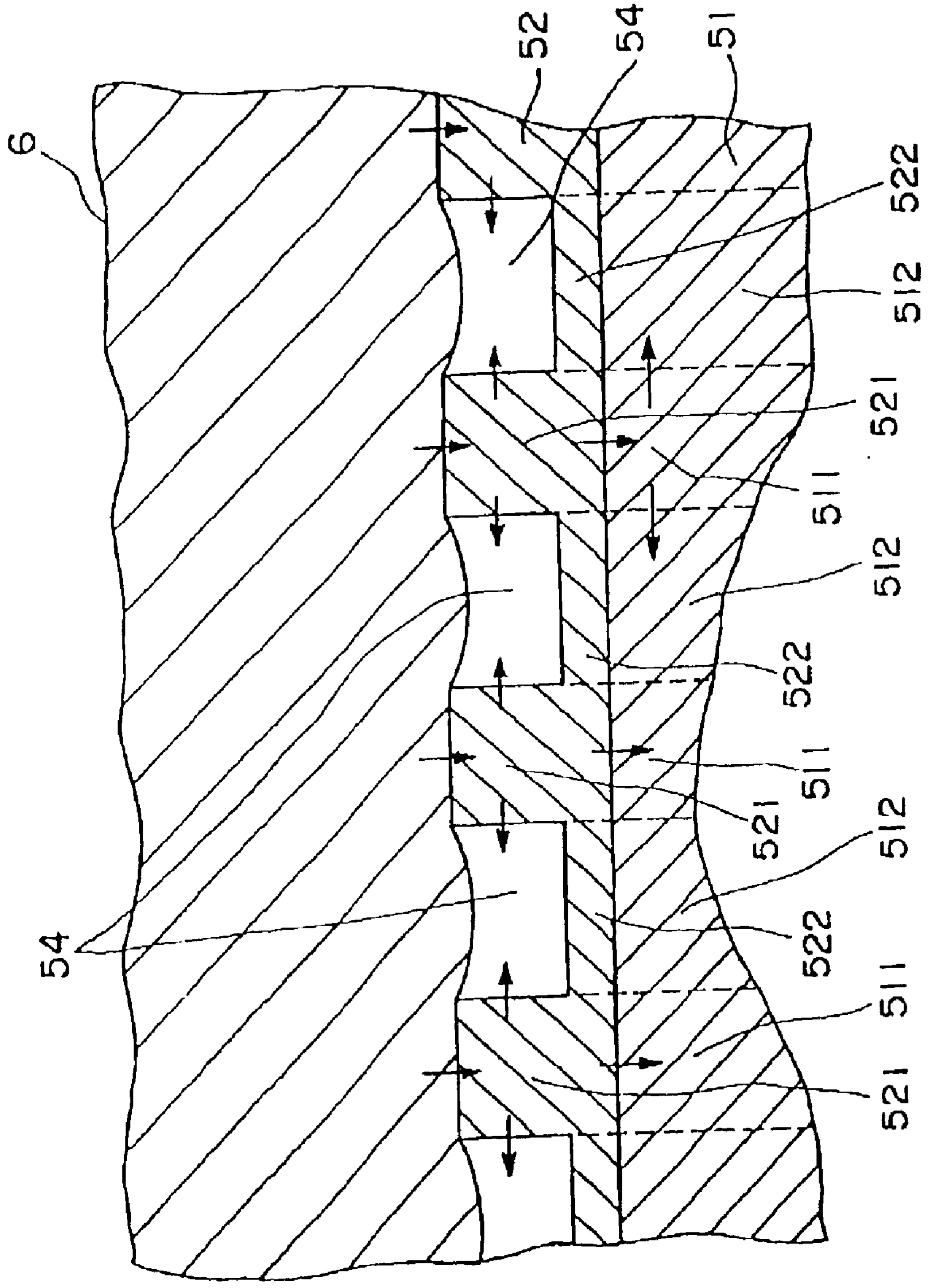
FIG. 4 is across-sectional view which schematically shows the situation caused in the vicinity of the colliding section of the molten alloy with respect to the cooling roll of the melt spinning apparatus shown in FIG. 1.

In this connection, FIG. 4 is a cross-sectional view which schematically shows the situation caused in the vicinity of the colliding section of the molten alloy with respect to the cooling roll of the melt spinning apparatus shown in FIG. 1. In this figure, the arrows indicate main paths of heat conduction caused in the vicinity of the cooling roll 5.

When the molten alloy 6 is to be contacted with the circumferential surface 53 of the cooling roll 5 in which the gas flow passages 54 described above are formed, the molten alloy 6 is in contact with the circumferential surface 53 excepting the portions 522 where the gas flow passages 54 are formed, while the molten alloy 6 does not contact the circumferential surface 53 at the portions 522. Therefore, a relatively large temperature rise occurs at the portions 521 of the circumferential surface 53 that are in contact with the molten alloy 6, while a comparatively low temperature-state is maintained at the portions 522.

The heat absorbed by the surface layer 52 in this way is transmitted to the roll base 51. In this case, since the temperature at the portions 522 is relatively low as compared with the temperature at the portions 521, the heat transmission to the roll base 51 is mainly achieved by the heat generated from the portions 521.

In this case, when the roll base 51 and the surface layer 52 are formed of the materials as described above, the roll base 51 normally has higher heat conductivity than that of the surface layer 52. The heat transmitted from the portions 521 to portions 511 of the roll base 51 is then transmitted to adjacent portions 512 of the roll base 51 immediately. As a result, dispersion of temperatures at these portions 511 and 512 is made small, so that a temperature rise in the roll base 51 is moderated as a whole.

Further, a part of the heat that has been transmitted to the portions 521 of the surface layer 52 from the molten alloy 6 is absorbed or dissipated to the gas flowing through the gas flowing passages 54 from the interior surfaces defining each gas flow passage 54. Therefore, the amount of the heat transmitted to the portions 511 from the portions 521 becomes small, so that the total amount of the heat transmitted to the roll base 51 is reduced, and this also contributes to the moderation of the temperature rise in the roll base 51.

For these reasons, thermal expansion occurring in the roll base 51 becomes small, so that difference between the thermal expansion of the surface layer 52 and the thermal expansion of the roll base 51 is made small. As a result, the firm bonding between the surface layer 52 and the roll base 51 can be maintained.

The surface roughness Ra of the circumferential surface 53 other than the portions in which the gas flow passages 54 are formed is not limited to a particular value, but it is preferred that the surface roughness Ra is in the range of 0.05–5 μm, and more preferably 0.07–2 μm. If the surface roughness Ra is lower than the lower limit value, the puddle 7 can not be sufficiently in contact with the cooling roll 5, which results in the case that formation of huge dimples can not be suppressed effectively. On the other hand, if the surface roughness Ra exceeds the upper limit value, dispersion in the thickness of the melt spun ribbon 8 becomes prominent, so that there is a possibility that dispersion in the crystal grain sizes and dispersion in the magnetic properties become large.

In this connection, it is to be noted that FIG. 3 is a sectional view which schematically shows the structure of a portion in the vicinity of the circumferential surface of the cooling roll, but in this figure a boundary surface between the roll base 51 and the surface layer 52 is omitted (this is the same as FIGS. 13, 15, 17, 19 and 20 described hereinbelows).

Figure 5:
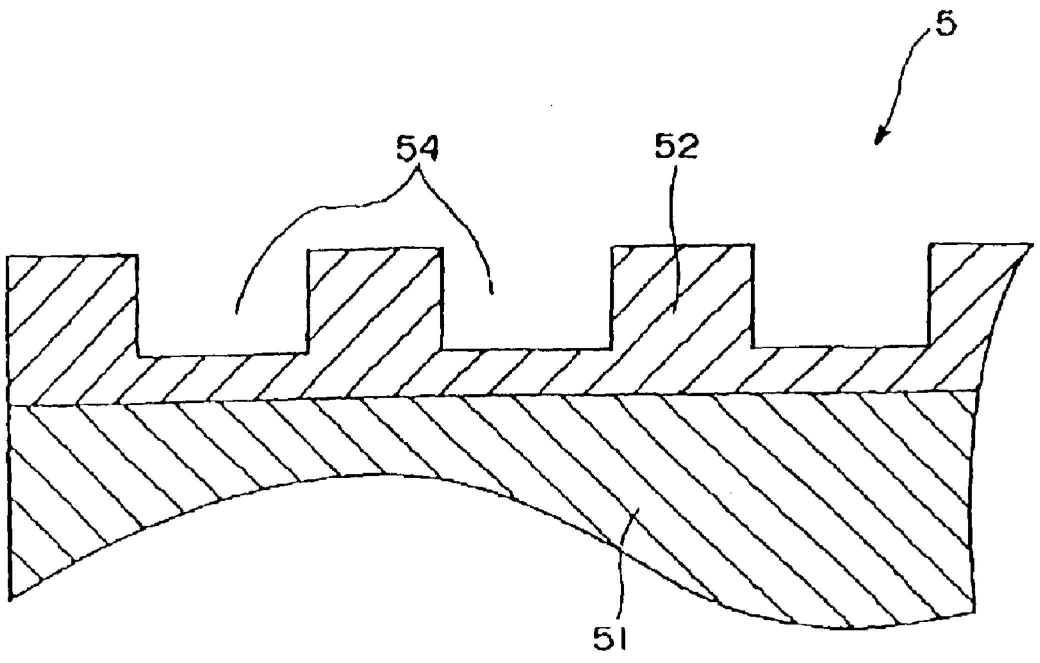
FIG. 5 is an illustration for explaining a method of forming a gas flow passage.
Figure 6:
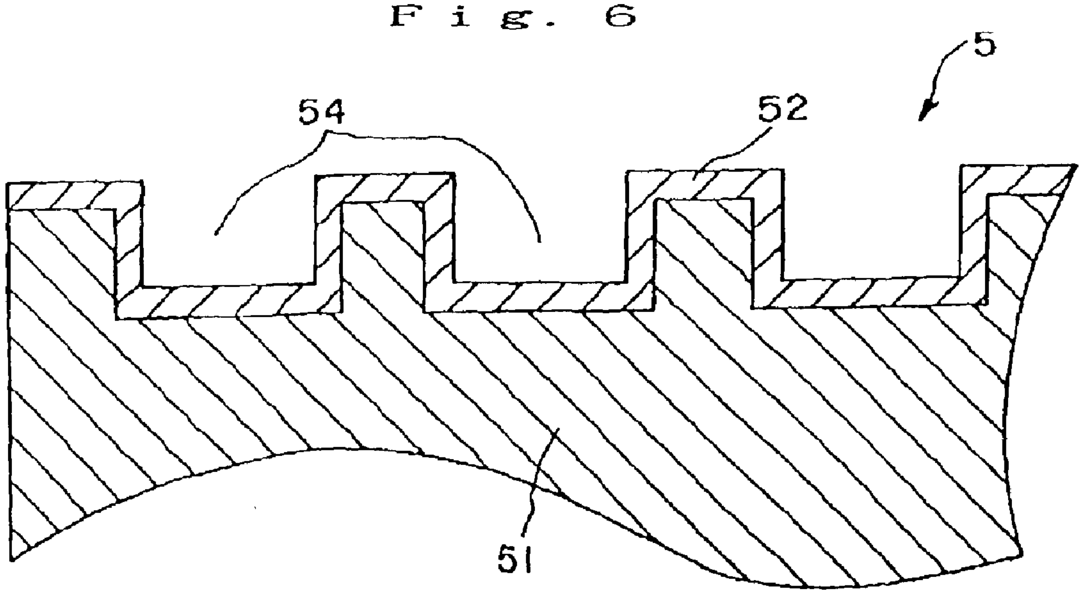
FIG. 6 is an illustration for explaining another method of forming the gas flow passage.

Next, a description will be made with regard to various methods for forming the gas flow passages 54 with reference to FIGS. 5 and 6.

Various methods can be used for forming the gas flow passages 54. Examples of the methods include various machining processes such as cutting, transfer (pressure rolling), gliding, blasting and the like, laser processing, electrical discharge machining, and chemical etching and the like. Among these methods, the machining process, especially gliding is particularly preferred, since according to the gliding the width and depth of each gas flow passage and the pitch of the adjacent gas flow passages can be relatively easily adjusted with high precision as compared with other methods.

The gas flow passages (grooves) 54 are normally formed in the surface layer 52, but other method may be used for forming the gas flow passages. Namely, as shown in FIG. 5, normally, after formation of the surface layer 52, the gas flow passages 54 are formed by any one of the gas flow passage forming methods mentioned above. However, as shown in FIG. 6, it is also possible to first form gas flow passages 54 onto the circumferential surface of the roll base 51 by any one of the gas flow passage forming methods mentioned above, and then to form a surface layer 52 thereon. According to this method, the gas flow passages 54 acting as the gas expelling means can be formed in the circumferential surface 53 without performing any machining process onto the surface layer 52. In this case, since no machining process is performed onto the surface layer 52, the surface roughness Ra of the circumferential surface 53 can be made small without performing polishing or the like at the later stage.

Alloy Composition of Magnetic Material

In this invention, it is preferred that the magnetic powder has excellent magnetic properties. For this purpose, the magnetic powder is preferably formed from alloys containing R (here, R is at least one of rare-earth elements containing Y). Among these alloys, alloys containing R, TM (here, TM is at least one of transition metals) and B (Boron) are particularly preferred. In this case, any one of the following alloys is preferably used.

(1) An alloy composed of, as base components thereof, a rare-earth element mainly containing Sm and a transition meal mainly containing Co (hereinafter, referred to "a Sm—Co based alloys").

(2) An alloy composed of, as base components thereof, R (here, R is at least one of the rare-earth elements containing Y), a transition metal mainly containing Fe (TM) and B (hereinafter, referred to as "R-TM-B based alloys").

(3) An alloy composed of, as base components thereof, a rare-earth element mainly containing Sm, a transition metal mainly containing Fe and an interstitial element mainly containing N (hereinafter, referred to as "Sm—Fe—N based alloys").

(4) An alloy composed of, as base components thereof, R (here, R is at least one of the rare-earth elements containing Y) and a transition meal such as Fe and having a nanocomposite structure in which a soft magnetic phase and a hard magnetic phase are adjacently existed (including the case where they are adjoined through an intergranular boundary phase).

(5) A mixture of two or more of the above-mentioned alloy compositions (1) to (4). In this case, the advantages of the alloy compositions to be mixed are enjoyed, so that more excellent magnetic properties can be obtained easily.

Typical examples of the Sm-Co based alloys include $SmCo_5$, $Sm_2TM_{17}$ (here, TM is a transition metal).

Typical examples of the R-Fe-B based alloys include Nd—Fe—B based alloys, Pr—Fe—B based alloys, Nd—Pr—Fe—B based alloys, Nd—Dy—Fe—B based alloys, Ce—Nd—Fe—B based alloys, Ce—Pr—Nd—Fe—B based alloys, and one of these alloys in which a part of Fe is replaced with other transition metal such as Co or Ni or the like.

Typical examples of the Sm—Fe—N based alloys include $Sm_2Fe_{17}N_3$ which is formed by nitrifying a $Sm_2Fe_{17}$ alloy and Sm—Zr—Fe—Co—N based alloys having a $TbCu_7$ phase as its main phase. In the case of the Sm—Fe—N based alloys, normally N is introduced with the form of interstitial atom by subjecting the melt spun ribbon to an appropriate heat treatment to nitrify it after the melt spun ribbon has been manufactured.

In this connection, examples of the rare-earth elements mentioned above include Y, La, Ce, Pr, Nd, Pm, Sm, Eu, Gd, Tb, Dy, Ho, Er, Tm, Yb, Lu, and a misch metal, and one or more of these rare-earth metals may be contained. Further, examples of the transition metals include Fe, Co, Ni and the like, and one or more of these metals may be contained.

Further, in order to enhance magnetic properties such as coercive force and maximum energy product and the like, or in order to improve heat resistance and corrosion resistance, the magnetic materials may contain Al, Cu, Ga, Si, Ti, V, Ta, Zr, Nb, Mo, Hf, Ag, Zn, P, Ge, Cr and W, as needed.

Figure 7:
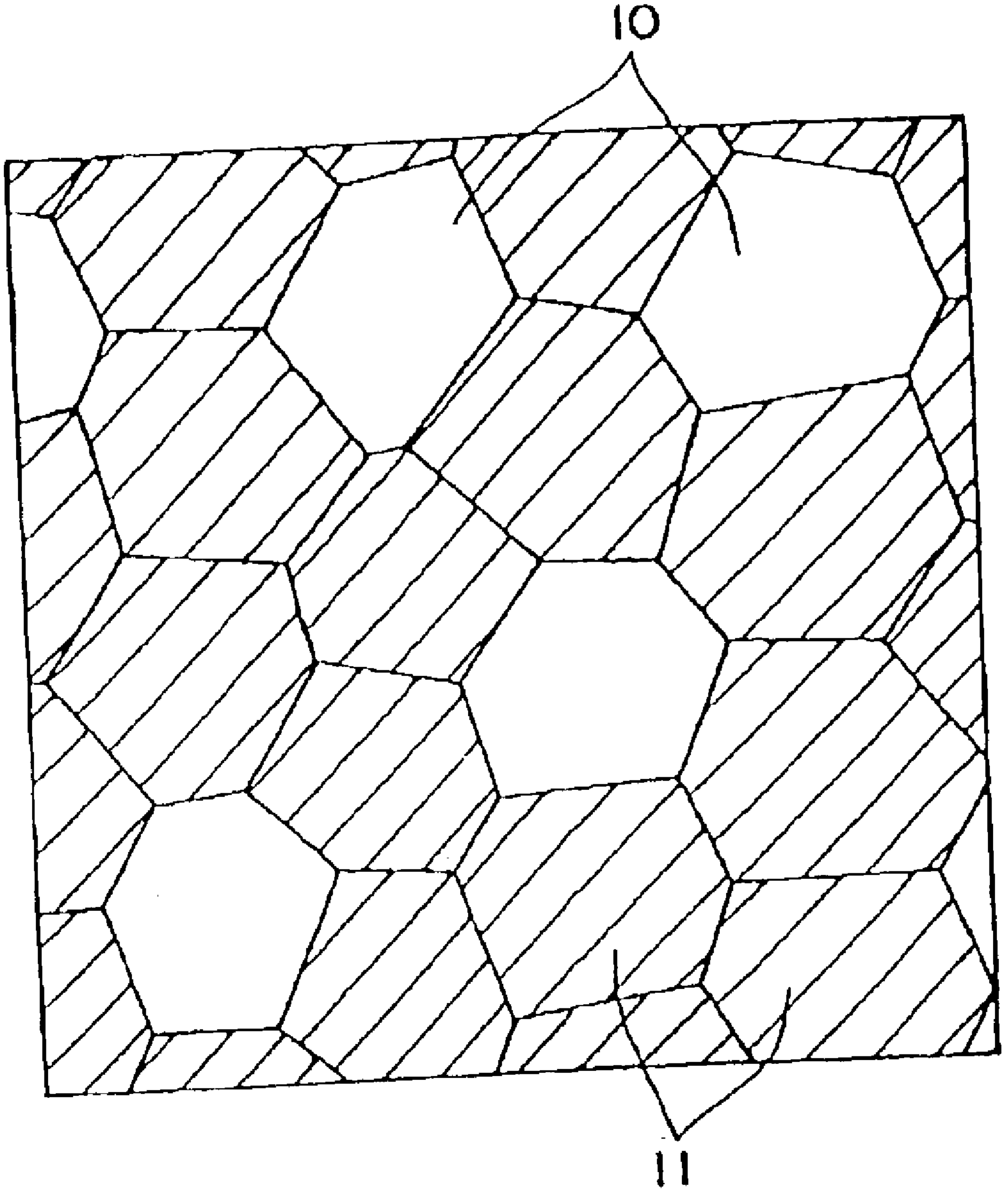
FIG. 7 is an illustration which schematically shows one example of the composite structure (nanocomposite structure) of the magnetic powder of the present invention.
Figure 8:
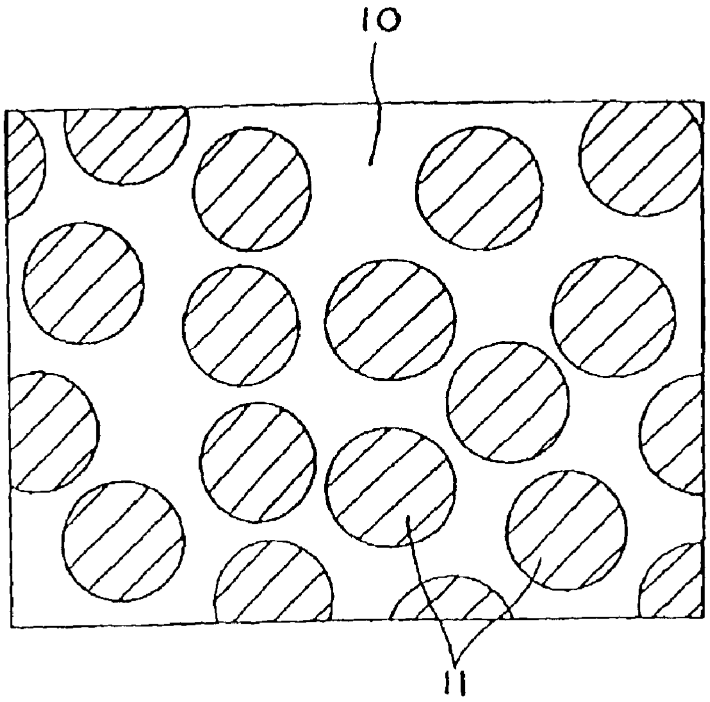
FIG. 8 is an illustration which schematically shows another example of the composite structure (nanocomposite structure) of the magnetic powder of the present invention.
Figure 9:
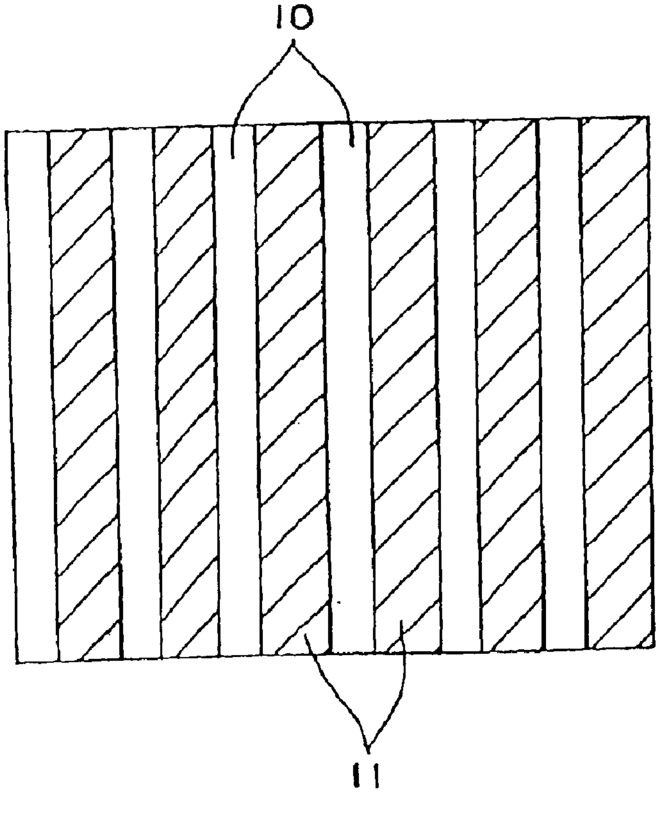
FIG. 9 is an illustration which schematically shows the other example of the composite structure (nanocomposite structure) of the magnetic powder of the present invention.

In this composite structure (nanocomposite structure), a soft magnetic phase 10 and a hard magnetic phase 11 exist with a pattern (model) as shown in, for example, FIG. 7, FIG. 8 or FIG. 9, in which the thickness of the respective phases and the grain sizes therein are on the order of nanometers. Further, the soft magnetic phase 10 and the hard magnetic phase 11 are arranged adjacent to each other (this also includes the case where these phases are adjacent through intergranular boundary phase), which makes it possible to perform magnetic exchange interaction therebetween.

The magnetization of the soft magnetic phase readily changes its orientation by the action of an external magnetic field. Therefore, when the soft magnetic phase coexists with the hard magnetic phase, the magnetization curve for the entire system shows a stepped "serpentine curve" in the second quadrant of the B-H diagram (J-H diagram). However, when the soft magnetic phase has a sufficiently small size of less than several tens of nm, magnetization of the soft magnetic phase is sufficiently and strongly constrained through the coupling with the magnetization of the surrounding hard magnetic phase, so that the entire system exhibits functions like a hard magnetic phase.

A magnet having such a composite structure (nanocomposite structure) has mainly the following five features.

(1) In the second quadrant of the B-H diagram (J-H diagram), the magnetization springs back reversively (in this sense, such a magnet is also referred to as a "spring magnet").

(2) It has a satisfactory magnetizability, so that it can be magnetized with a relatively low magnetic field.

(3) The temperature dependence of the magnetic properties is small as compared with the case where the system is constituted from a hard magnetic phase alone.

(4) The changes in the magnetic properties with the elapse of time are small.

(5) No deterioration in the magnetic properties is observable even if it is finely milled.

As described above, magnets composed of the composite structure have excellent magnetic properties. Therefore, it is preferred that the magnetic powders according to the present invention have such a composite structure.

In this regard, it is to be understood that the patterns shown in FIGS. 7 to 9 are mere examples, and the composite structure is not limited thereto.

Manufacture of Ribbon-shaped Magnetic Material

Hereinbelow, description will be made with regard to the manufacturing of the ribbon-shaped magnetic material (that is, melt spun ribbon 8) using the melt spinning apparatus 1 described above.

The ribbon-shaped magnetic material is manufactured by colliding a molten alloy of a magnetic material onto the circumferential surface of the cooling roll to cool and then solidify it. Hereinbelow, one example thereof will be described.

Figure 10:
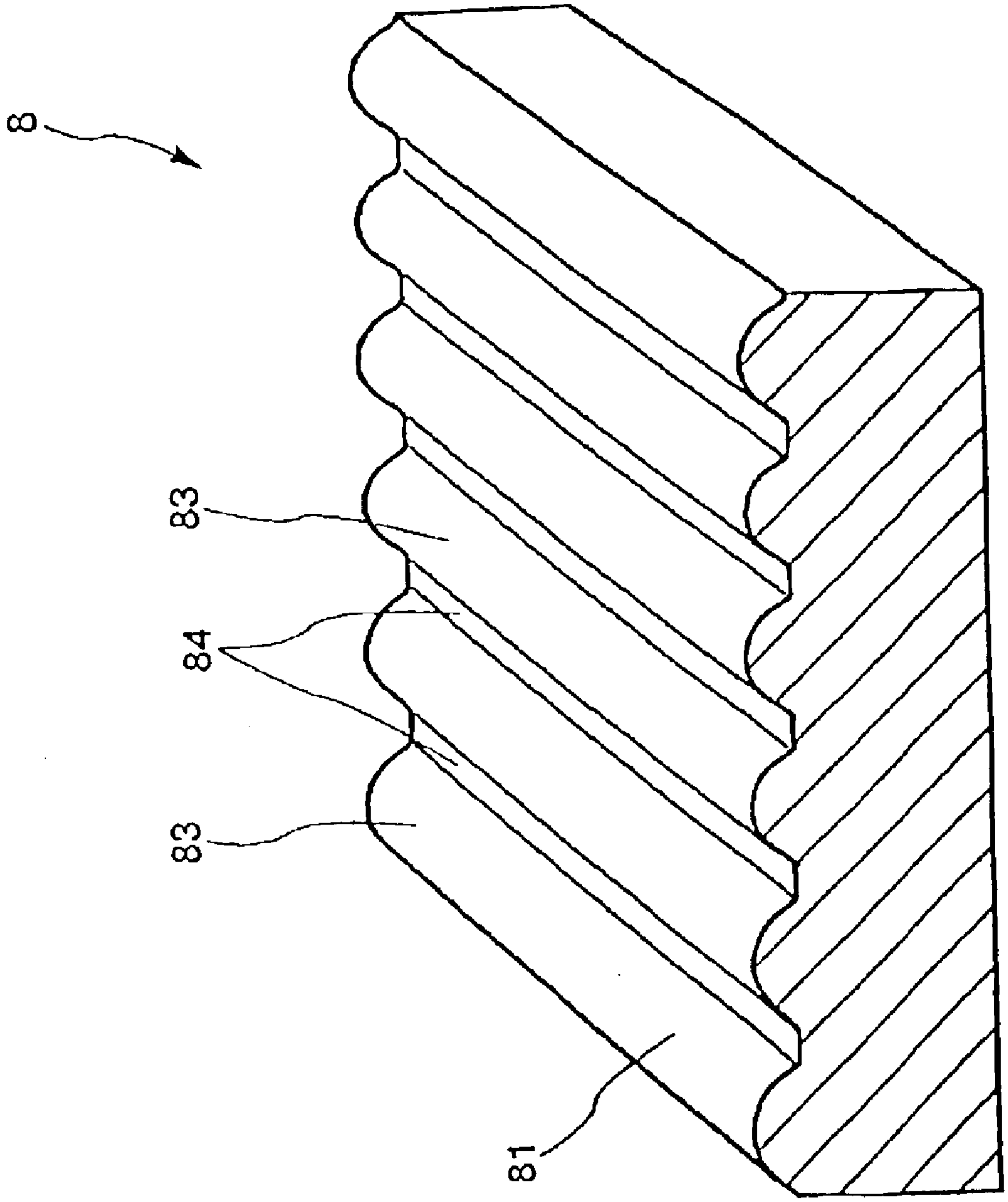
FIG. 10 is a perspective view which schematically shows a surface condition of a melt spun ribbon manufactured by the melt spinning apparatus shown in FIG. 1.

FIG. 10 is a perspective view which schematically shows a surface condition of a melt spun ribbon manufactured by the melt spinning apparatus shown in FIG. 1.

Such a melt spinning apparatus shown in FIG. 1 is installed in a chamber (not shown), and it is operated under the condition that the interior of the chamber is filled with an inert gas or other kind of ambient gas. In this case, in order to prevent oxidation of a melt spun ribbon 8, it is preferable that the ambient gas is an inert gas. Examples of such an inert gas include argon gas, helium gas, nitrogen gas or the like.

The pressure of the ambient gas is not particularly limited to a specific value, but 1–760 Torr is preferable.

A predetermined pressure which is higher than the internal pressure of the chamber is applied to the surface of the liquid of the molten alloy 6 in the cylindrical body 2. The molten alloy 6 is injected from the nozzle 3 by the differential pressure between the pressure of the ambient gas in the chamber and the summed pressure of the pressure applied to the surface of the liquid of the molten alloy 6 in the cylindrical body 2 and the pressure exerted in the cylindrical body 2 in proportion to the liquid level.

The molten alloy injecting pressure (that is, the differential pressure between the pressure of the ambient gas in the chamber and the summed pressure of the pressure applied to the surface of the liquid of the molten alloy 6 in the cylindrical body 2 and the pressure exerted in the cylindrical body 2 in proportion to the liquid level) is not particularly limited to a specific value, but 10–100 kPa is preferable.

In the melt spinning apparatus 1, a magnetic material (alloy) is placed in the cylindrical body 2 and melted by heating with the coil 4, and then the molten alloy 6 is injected from the nozzle 3. Then, as shown in FIG. 1, the molten alloy 6 collides with the circumferential surface 53 of the cooling roll 5, and after the formation of a puddle 7, the molten alloy 6 is cooled down rapidly to be solidified while being dragged along the circumferential surface 53 of the rotating cooling roll 5, thereby forming a melt spun ribbon 8 in a continuous or intermittent manner. Under the situation, gas which has entered between the puddle 7 and the circumferential surface 53 is expelled or discharged to the outside through the gas flow passages 54. The roll contact surface 81 of the melt spun ribbon 8 thus formed is soon released from the circumferential surface 53, and the melt spun ribbon 8 proceeds in the direction of an arrow B in FIG. 1.

Since the gas flow passages 54 are provided in the circumferential surface 53, the puddle 7 can be reliably in contact with the circumferential surface 53 to prevent formation of huge dimples. Further, ununiform cooling of the puddle 7 is also prevented. As a result, it is possible to obtain a melt spun ribbon 8 having high magnetic properties.

In this connection, it is to be noted that when manufacturing such a melt spun ribbon 8, it is not always necessary to install the nozzle 3 just above the rotation axis 50 of the cooling roll 5.

The optimum range of the peripheral velocity of the cooling roll 5 depends upon the composition of the molten alloy, the structural material (composition) of the surface layer 52, and the surface condition of the circumferential surface 53 (especially, the wettability of the surface layer 52 with respect to the molten alloy 6), and the like. However, for enhancement of the magnetic properties, a peripheral velocity in the range of 5 to 60 m/s is normally preferable, and 10 to 40 m/s is more preferable. If the peripheral velocity of the cooling roll 5 is less than the above lower limit value, the cooling rate of the molten alloy 6 is decreased. This tends to increase the crystal grain size, thus leading to the case that the magnetic properties are lowered. On the other had, when the peripheral velocity of the cooling roll 5 exceeds the above upper limit value, the cooling rate is too high, so that amorphous structure becomes dominant. In such melt spun ribbon, there is a case that the magnetic properties can not be sufficiently improved even if a heat treatment described below is given in the later stage.

It is preferred that thus obtained melt spun ribbon 8 has uniform width w and thickness t. In this case, the average thickness t of the melt spun ribbon 8 should preferably lie in the range of 8–50 $\mu$m and more preferably lie in the range of 10–40 $\mu$m. If the average thickness t is less than the lower limit value, amorphous structure becomes dominant, so that there is a case that the magnetic properties can not be sufficiently improved even if a heat treatment is given in the later stage. Further, productivity per an unit time is also lowered. On the other hand, if the average thickness t exceeds the above upper limit value, the crystal grain size at the side of the roll contact surface 81 of the melt spun ribbon 8 tends to be coarse, so that there is a case that the magnetic properties are lowered.

Further, the obtained melt spun ribbon 8 may be subjected to at least one heat treatment for the purpose of, for example, acceleration of recrystallization of the amorphous structure and homogenization of the structure. The conditions of this heat treatment may be, for example, a heating at a temperature of 400 to 900° C. for 0.5 to 300 min.

In this case, in order to prevent oxidation, it is preferred that this heat treatment is performed in a vacuum or under a reduced pressure (for example, in the range of $1\times10^{-1}$ to $1\times10^{-6}$Torr), or in a nonoxidizing atmosphere of an inert gas such as nitrogen gas, argon gas, helium gas or the like.

Thus obtained melt spun ribbon (ribbon-shaped magnetic material) 8 has a microcrystalline structure or a structure in which microcrystals are included in an amorphous structure, and exhibits excellent magnetic properties.

Further, it is preferred that at least a part of the roll contact surface 81 of the melt spun ribbon 8 is formed with a pattern which is produced by transfer of the shape or form of the circumferential surface 53 of the cooling roll 5. Specifically, as shown in FIG. 10, at least a part of the roll contact surface 81 of the melt spun ribbon 8 is formed with ridges 83 or recesses 84 which correspond to the shape or form of the circumferential surface 53 of the cooling roll 5.

When magnetic powder obtained by milling the melt spun ribbon 8 having such ridges 83 or recesses 84 is used to manufacture a bonded magnet described later, a binding resin enters recesses (spaces between the ridges) of particles of the magnetic powder. Accordingly, a bonding strength between the magnetic powder and the binding resin is increased, so that a high mechanical strength can be obtained with a relatively small amount of the binding resin. This means that the bonded magnet can contain a relatively large amount of magnetic powder, and therefore have especially excellent magnetic properties. Further, when such recesses or ridges are formed in the surface of each particle of the magnetic powder, the magnetic powder can be sufficiently in contact with the binding resin during the kneading process thereof (that is, wettability is increased). Therefore, in the compound obtained by kneading the magnetic powder and the binding resin, the biding resin is adapted to cover the periphery of each particle of the magnetic powder, so that good moldability can be obtained with a relatively small amount of the binding resin.

Due to these results described above, it is possible to manufacture bonded magnets having high mechanical strength and excellent magnetic properties with good moldability.

Further, in the melt spun ribbon 8 as described above, the average crystal grain size is preferably equal to or less than 500 nm, more preferably equal to or less than 200 nm, and most preferably lies in the range of 10–120 nm. If the average crystal grain size exceeds 500 nm, there is a case that magnetic properties, especially coercive force and rectangularity can not be sufficiently improved.

In particular, when the magnetic material is an alloy having the composite structure as described (4) in the above, the average crystal grain size of the soft magnetic phase 10 and hard magnetic phase 11 should preferably lie in the range of 1–100 nm, and more preferably lie in the range of 5–50 nm. When the average crystal grain size lies in this range, more effective magnetic exchange interaction occurs between the soft magnetic phase 10 and the hard magnetic phase 11, so that markedly improved magnetic properties can be recognized.

Furthermore, when the average crystal grain size of the hard magnetic phase 11 near the roll contact surface 81 is defined as D1*h*, the average crystal grain size of the soft magnetic phase 10 near the roll contact surface 81 is defined as D1*s*, the average crystal grain size of the hard magnetic phase 11 near the free surface 82 is defined as D2*h*, and the average crystal grain size of the soft magnetic phase 10 near the free surface 82 is defined as D2*s*, it is preferable that at least one of the following equations (IV) and (V) is satisfied. Further, it is more preferable that both the equations are satisfied.

$$0.5 \leqq D1h/D2h \leqq 1.5 \quad \text{(IV)}$$

$$0.5 \leqq D1s/D2s \leqq 1.5 \quad \text{(V)}$$

When the value of D1*h*/D2*h* or D1*s*/D2*s* is in the range of 0.5–1.5, the difference between the crystal grain size near the roll contact surface 81 and the crystal grain size near the free surface 82 is small in both the hard magnetic phase 11 and the soft magnetic phase 10. As a result, magnetic powder has uniform magnetic properties, and therefore bonded magnet shaving excellent magnetic properties can be obtained. In more details, when magnetic powder is formed from the melt spun ribbon 8 described above, and then bonded magnets are manufactured using the magnetic powder, the bonded magnets can have high magnetic energy product $(BH)_{max}$ as well as excellent rectangularity in its hysteresis loop. As a result, the absolute value of the irreversible flux loss is made small, thus improving the reliability of the bonded magnets.

In the foregoing, the description was made with reference to the single roll method. However, it is of course possible to use a twin roll method. When the twin roll method is used, ridges or recesses as described above can be formed on the opposite surfaces of the obtained melt spun ribbon, respectively. Further, according to these quenching methods, the metallic structure (that is, crystal grain) can be formed into microstructure, so that these methods are particularly effective in improving magnetic properties of bonded magnets, especially coercive force thereof.

Manufacture of Magnetic Powder

Figure 11:
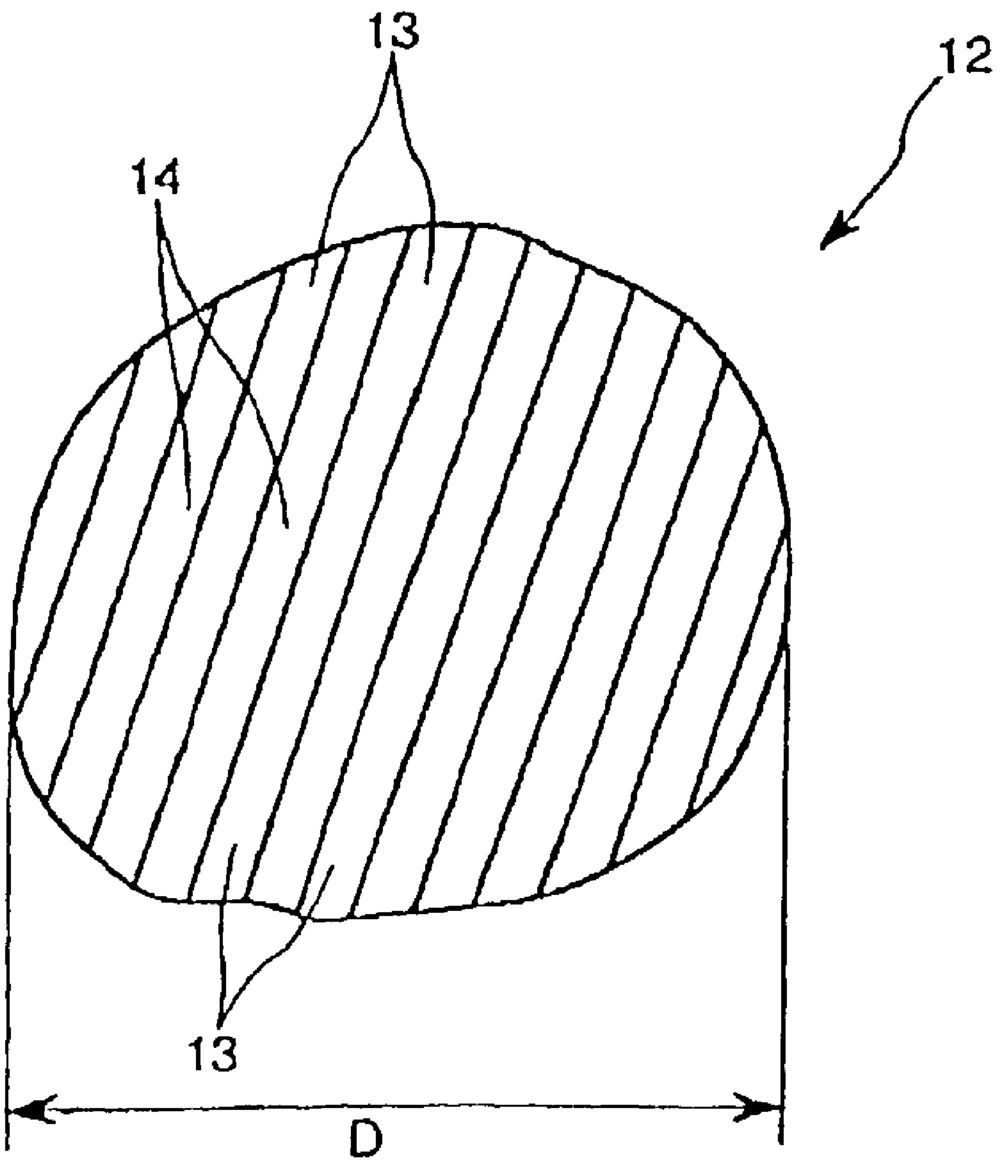
FIG. 11 is a perspective view which schematically shows a surface condition of a particle of magnetic powder which is obtained by milling the melt spun ribbon manufactured by the melt spinning apparatus shown in FIG. 1.

The magnetic powder of this invention is obtained by milling the melt spun ribbon 8 which is manufactured as described above. In this connection, FIG. 11 is a perspective view which schematically shows a surface condition of a particle of magnetic powder which is obtained by milling the melt spun ribbon manufactured by the melt spinning apparatus shown in FIG. 1.

The milling method of the melt spun ribbon is not particularly limited, and various kinds of milling or crushing apparatus such as ball mill, vibration mill, jet mill, and pin mill maybe employed. In this case, in order to prevent oxidation, the milling process may be carried out in vacuum or under a reduced pressure (for example, under a reduced pressure of $1\times10^{31}$ $^{1}$to $1\times10^{-6}$ Torr), or in a nonoxidizing atmosphere of an inert gas such as nitrogen, argon, helium, or the like.

In the meantime, as described above, when the molten alloy 6 is collided with the circumferential surface 53 of the cooling roll 5, portions of the circumferential surface 53 where the gas flow passages 54 are not formed are in contact with the molten alloy 6 while portions of the circumferential surface 53 where the gas flow passages 54 are formed do not substantially contact the molten alloy 6. Therefore, the cooling rate at portions of the molten alloy 6 which do not contact the cooling roll 5 is smaller as compared with the cooling rate at portions of the molten alloy 6 which are in contact with the cooling roll 5. Accordingly, if the particle size (diameter) of the magnetic powder obtained by milling the melt spun ribbon 8 is smaller than the pitch of the adjacent gas flow passages 54, the difference between the average crystal grain size of the particles of the magnetic powder obtained from the portions of the melt spun ribbon 8 which have been in contact with cooling roll 5 and the average crystal grain size of the particles of the magnetic powder obtained from the portions which did not contact the cooling roll 5 becomes large. As a result, dispersion in magnetic properties among the particles of the magnetic powder becomes large. In view of this problem, in the present invention, the average size D[$\mu$m] of the particles of the magnetic powder is determined so as to have the following relationship with respect to the average pitch P[$\mu$m].

$P<D$

In this regard, it is more preferable that the relationship of $1.1 \leqq D/P \leqq 60$ is established, and it is most preferable that the relationship of $2 \leqq D/P \leqq 30$ is established. When such relationship is established between the values of D and P, dispersion in magnetic properties of the particles of the magnetic powder become small so that the magnetic powder can have excellent magnetic properties as a whole.

When the magnetic powder is used for manufacturing bonded magnets described later, the value D of the average particle size of the magnetic powder 12 should lie in the range of 5 to 300 $\mu$m, and preferably lie in the range of 10 to 20 $\mu$m from the view points of preventing oxidization of the magnetic powder and preventing deterioration of the magnetic properties during the milling process.

In order to obtain a better moldability during the manufacturing process of the bonded magnets, it is preferable to give a certain degree of dispersion to the particle size distribution of the magnetic powder. By so doing, it is possible to reduce the void ratio (porosity) of the bonded magnet obtained. As a result, it is possible to increase the density and the mechanical strength of the bonded magnet as compared with a bonded magnet having the same content of the magnetic powder, thereby enabling to further improve the magnetic properties.

In this case, the average diameter D can be measured by a F.S.S.S. (Fischer Sub-Sieve Sizer) method or a sieving method and the like.

Further, when the melt spun ribbon 8 having the roll contact surface 81 to which the shape or form of the circumferential surface 53 of the cooling roll 5 has been transferred is used, the obtained magnetic powder is comprised of particles of which surfaces are formed with a number of ridges 13 or recesses 14. By using such magnetic powder, the following effects will be realized.

Namely, as described above, when such magnetic powder is used for manufacturing bonded magnets, a binding resin is adapted to enter the recessesor (gaps between the ridges). This improves bonding strength between the magnetic powder and the binding resin, so that it becomes possible to obtain bonded magnets having high mechanical strength with use of a relatively small amount of a binding resin. Further, this in turn means that the obtained bonded magnets can contain a relatively large amount of magnetic powder, so that it is possible to obtain bonded magnets having especially excellent magnetic properties.

Further, when such recesses 14 or ridges 13 are formed in the outer surface of each particle of the magnetic powder, the magnetic powder can be sufficiently in contact with the binding resin during the kneading process thereof (that is, wettability is increased). Therefore, in the compound obtained by kneading the magnetic powder and the binding resin, the biding resin is adapted to cover the periphery of each particle of the magnetic powder, so that good moldability can be obtained with use of a relatively small amount of the binding resin.

Due to these effects, it is possible to manufacture bonded magnets having high mechanical strength and excellent magnetic properties with good moldability.

When the average particle size (diameter) of the magnetic powder is defined as $\mu$m, it is preferable that the length of the each recess or ridge is D/40 $\mu$m or more, and it is more preferable that the length is D/30 $\mu$m or more.

If the length of the recess or ridge is less than D/40 $\mu$m, there is a case that the effects of the present invention can not be sufficiently exhibited depending on the value of the average diameter D of the magnetic powder 12 or the like.

The average height of the ridges 13 or the average depth of the recesses 14 is preferably 0.1 to 10 $\mu$m, and more preferably 0.3 to 5 $\mu$m.

If the average height of the ridges 13 or the average depth of the recesses 14 is in the rage described above, a necessary and large amount of the biding resin can enter the recesses or gaps between the ridges when the magnetic powder 12 is used for manufacturing bonded magnets, so that bonding strength between the magnetic powder and the binding resin is further improved, and therefore obtained bonded magnets can have further improved mechanical strength and magnetic properties.

Further, it is preferred that the average pitch of the adjacent two ridges 13 or recesses 14 is 0.5–100 $\mu$m, and more preferably 3–50 $\mu$m. When the average pitch of the adjacent two ridges or recesses is within this range, the effects of the present invention described above are more conspicuous.

Further, it is also preferred that a ratio of an area of the part of the particle of the magnetic powder where the ridges 13 or recesses 14 are formed with respect to the entire surface area of the particle is equal to or greater than 15%, and more preferably equal to or greater than 25%.

If the ratio of the area of the part of the particle where the ridges or recesses are formed with respect to the entire surface area of the particle is less than 15%, there is a case that the effects of the present invention described above are not sufficiently exhibited.

Thus obtained magnetic powder may be subjected to a heat treatment for the purpose of, for example, removing the influence of stress introduced by the milling process and controlling the crystal grain size. The conditions of the heat treatment are, for example, heating at a temperature in the range of 350 to 850° C. for 0.5 to 300 min.

In order to prevent oxidation of the magnetic powder, it is preferable to perform the heat treatment in a vacuum or under a reduced pressure (for example, in the range of $1\times10^{-1}$ to $1\times10^{-6}$ Torr), or in a nonoxidizing atmosphere of an inert gas such as nitrogen gas, argon gas, and helium gas.

Thus obtained magnetic powder can achieve a satisfactory binding with binding resins (wettability of binding resins). Therefore, when a bonded magnet is manufactured using the magnetic powder described above, the bonded magnet has high mechanical strength as well as excellent thermal stability (heat resistance) and corrosion resistance. Consequently, it can be concluded that the magnetic powder is suitable for the manufacture of a bonded magnet, and the manufactured bonded magnet has high reliability.

In such magnetic powder as described above, the average crystal grain size of the magnetic powder should preferably be equal to or less than 500 nm, more preferably equal to or less than 200 nm, and most preferably lie in the range of 10–120 nm. If the average crystal grain size exceeds 500 nm, there is a case that magnetic properties, especially coercive force and rectangularity can not be sufficiently improved.

In particular, when the magnetic material is an alloy having the composite structure as described (4) in the above, the average crystal grain size should preferably lie in the range of 1–100 nm, and more preferably lie in the range of 5–50 nm. When the average crystal grain size lies in this range, more effective magnetic exchange interaction occurs between the soft magnetic phase 10 and the hard magnetic phase 11, so that markedly improved magnetic properties can be recognized.

Bonded Magnet and Manufacturing thereof

Hereinbelow, a description will be made with regard to the bonded magnet according to the present invention.

The bonded magnet according to the present invention is manufactured by binding the magnetic powder described-above using a binding resin (binder).

As for the binder, either of a thermoplastic resin or a thermosetting resin may be employed.

Examples of the thermoplastic resin include polyamid (example: nylon 6, nylon 46, nylon 66, nylon 610, nylon 612, nylon 11, nylon 12, nylon 6–12, nylon 6–66); thermoplastic polyimide; liquid crystal polymer such as aromatic polyester; poly phenylene oxide; poly phenylene sulfide; polyolefin such as polyethylene, polypropylene and ethylene-vinyl acetate copolymer; modified polyolefin; polycarbonate; poly methyl methacrylate; polyester such as poly ethylen terephthalate and poly butylene terephthalate; polyether; polyether ether ketone; polyetherimide; polyacetal; and copolymer, blended body, and polymer alloy having at least one of these materials as a main ingredient. In this case, a mixture of two or more kinds of these materials may be employed.

Among these resins, a resin containing polyamide as its main ingredient is particularly preferred from the viewpoint of especially excellent moldability and high mechanical strength. Further, a resin containing liquid crystal polymer and/or poly phenylene sulfide as its main ingredient is also preferred from the viewpoint of enhancing the heat resistance. Furthermore, these thermoplastic resins also have an excellent kneadability with the magnetic powder.

These thermoplastic resins provide an advantage in that a wide range of selection can be made. For example, it is possible to provide a thermoplastic resin having a good moldability or to provide a thermoplastic resin having good heat resistance and mechanical strength by appropriately selecting their kinds, copolymerization or the like.

On the other hand, examples of the thermosetting resin include various kinds of epoxy resins of bisphenol type, novolak type, and naphthalene-based, phenolic resins, urea resins, melamine resins, polyester (or unsaturated polyester) resins, polyimide resins, silicone resins, polyurethane resins, and the like. In this case, a mixture of two or more kinds of these materials may be employed.

Among these resins, the epoxy resins, phenolic resins, polyimide resins and silicone resins are preferable from the viewpoint of their special excellence in the moldability, high mechanical strength, and high heat resistance. In these resins, the epoxy resins are especially preferable. These thermosetting resins also have an excellent kneadability with the magnetic powder and homogeneity (uniformity) in kneading.

The unhardened thermosetting resin to be used may be either in a liquid state or in a solid (powdery) state at a room temperature.

The bonded magnet according to this invention described in the above may be manufactured, for example, as in the following. First, the magnetic powder, a binding resin and an additive (antioxidant, lubricant, or the like) as needed are mixed and kneaded to form a bonded magnet composite (compound). Then, thus obtained bonded magnet composite is formed into a desired magnet form in a space free from magnetic field by a molding method such as compaction molding (press molding), extrusion molding, or injection molding. When the binding resin used is a thermosetting type, the obtained green compact is hardened by heating or the like after molding.

In this case, the kneading process may be carried out at a room temperature. However, it is preferred that the kneading is carried out at a temperature in which the used resin is begun to be soften or a higher temperature thereof. In particular, when the binding resin used is a thermosetting resin, it is preferred that the kneading is carried out at a temperature higher than a temperature in which the binding resin is begun to be softened and lower than a temperature in which the binding resin is begun to be hardened.

By carrying out the kneading under these temperatures, the kneading efficiency is improved and the kneading is carried out uniformly in a shorter time as compared with the kneading at a room temperature. Further, since the kneading is carried out under the condition that viscosity of the binding resin is lowered, bindability between the magnetic powder and the binding resin is improved so that void ratio (porosity) of the compound can be made small. In particular, in the case where ridges 13 or recesses 14 are formed on the surfaces of the particles of the magnetic powder, the softened or melted resin can enter the recesses or gaps between the ridges effectively. As a result, the void ratio can be further reduced. Further, this also contributes to reducing the amount of the binding resin to be contained in the compound.

Further, it is preferred that the molding according to any one of the molding methods is carried out at a temperature in which the binding resin is begun to be softened or melted (that is, warm kneading).

By carrying out the molding under such temperatures, the fluidity of the binding resin is improved, so that excellent moldability can be secured even in the case where a relatively small amount of the binding resin is used. Further, since the fluidity of the binding resin is improved, the binding resin becomes sufficiently and reliably in contact with the magnetic powder, so that void ratio of the bonded magnet can be made small. In particular, when the ridges 13 or recesses 14 are formed on the surfaces of the particles of the magnetic powder, the binding resin which has been softened or melted effectively enters the recesses or the gaps between the ridges. With this result, the bonding strength between the magnetic powder and the binding resin is further improved, and the void ratio of the obtained bonded magnet can be made small, so that it is possible to manufacture a bonded magnet having a high density and excellent magnetic properties and mechanical strength.

One example of the indexes for indicating the mechanical strength is mechanical strength obtained by a shear strength by punching-out test known as “Testing Method of Measuring Shear Strength by Punching-out Small Specimen of Bonded Magnets” which is determined by the standard of Electronic Materials Manufactures Association of Japan under the code number of EMAS-7006. In the case of the bonded magnet of the present invention, the mechanical strength of the bondedmagnet according to this test should preferably be equal to or larger than 50 MPa and more preferably be equal to or larger than 60 MPa.

The content of the magnetic powder in the bonded magnet is not particularly limited, and it is normally determined by considering the kind of the molding method to be employed and the compatibility of moldability and high magnetic properties. For example, it is preferred that the content is in the range of 75–99.5 wt %, and more preferably in the range of 85–97.5 wt %.

In particular, in the case of a bonded magnet manufactured by the compaction molding method, the content of the magnetic powder should preferably lie in the range of 90–99.5 wt %, and more preferably in the range of 93–98.5 wt %.

Further, in the case of a bonded magnet manufactured by the extrusion molding or the injection molding, the content of the magnetic powder should preferably lie in the range of 75–98 wt %, and more preferably in the range of 85–97 wt %.

Further, as described above, when the ridges or recesses are formed on at least a part of the outer surface of each particle of the magnetic powder, the bonding strength between the magnetic powder and the binding resin becomes especially excellent. For this reason, high mechanical strength can be obtained even if a relatively small amount of the binding resin is used. As a result, it becomes possible to increase the amount of the magnetic powder to be contained, so that a bonded magnet having high magnetic properties can be obtained.

The density ρ of the bonded magnet is determined by factors such as the specific gravity of the magnetic powder contained in the bonded magnet, the content of the magnetic powder, and the void ratio (porosity) of the bonded magnet and the like. In the bonded magnets according to this invention, the density ρ is not particularly limited to a specific value, but it is preferable to be in the range of 4.5–6.6 $Mg/m^3$, and more preferably in the range of 5.5–6.4 $Mg/m^3$.

In this invention, the shapes (forms), dimensions and the like of the bonded magnet are not particularly limited. For example, as to the shape, all shapes such as columnar shape, prism-like shape, cylindrical shape (annular shape), arched shape, plate-like shape, curved plate-like shape, and the like are acceptable. As to the dimensions, all sizes starting from large-sized one to ultraminuaturized one are acceptable. However, as repeatedly described in this specification, the present invention is particularly advantageous when it is used for miniaturized magnets and ultraminiaturized magnets.

Further, in the present invention, it is preferred that the coercive force ($H_{CJ}$) (intrinsic coercive force at a room temperature) of the bonded magnet lies in the range of 320 to 1200 kA/m, and more preferably in the range of 400 to 800 kA/m. If the coercive force ($H_{CJ}$) is lower than the lower limit value, demagnetization occurs conspicuously when a reverse magnetic field is applied, and the heat resistance at a high temperature is deteriorated. On the other hand, if the coercive force ($H_{CJ}$) exceeds the above upper limit value, magnetizability is deteriorated. Therefore, by setting the coercive force ($H_{CJ}$) to the above range, in the case where the bondedmagnet is subjected to multipolar magnetization, a satisfactory magnetization can be accomplished even when a sufficiently high magnetizing field cannot be secured. Further, it is also possible to obtain a sufficient magnetic flux density, thereby enabling to provide high performance bonded magnets.

Furthermore, in the present invention, it is preferable that the maximum magnetic energy product $(BH)_{max}$ of the bonded magnet is equal to or greater than 40 $kJ/m^3$, more preferably equal to or greater than 50 kJ/m3, and most preferably in the range of 70 to 130 $kJ/m^3$. When the maximum magnetic energy product $(BH)_{max}$ is less than 40 $kJ/m^3$, it is not possible to obtain a sufficient torque when used for motors depending on the types and structures thereof.

As described above, since the cooling roll 5 which is used in the manufacturing method of the magnetic powder of the present invention is provided with the gas flow passages 54, the gas that has entered between the circumferential surface 53 and the puddle 7 can be expelled. This prevents the puddle 7 from being released (or lifted up) from the circumferential surface 53, so that the puddle 7 can be sufficiently and reliably in contact with the circumferential surface 53. With this result, it is possible to obtain a melt spun ribbon 8 having less dispersion in magnetic properties at various portions thereof and therefore having high magnetic properties. Further, since the average particle size D[μm] of the particles of the magnetic powder obtained by milling the melt spun ribbon 8 satisfies the relationship $P<D$ with respect to the average pitch P[μm] of the gas flow passages 54, there is less dispersion of magnetic properties among the respective particles of the magnetic powder, thus the magnetic properties of the magnetic powder as a whole become excellent.

Therefore, the bonded magnet manufactured from the melt spun ribbon 8 can have excellent magnetic properties. Further, high magnetic properties can be obtained without pursing a high density when manufacturing bonded magnets. This means that the obtained bonded magnets can have improved moldability, dimensional accuracy, mechanical strength, corrosion resistance and heat resistance and the like.

Figure 12:
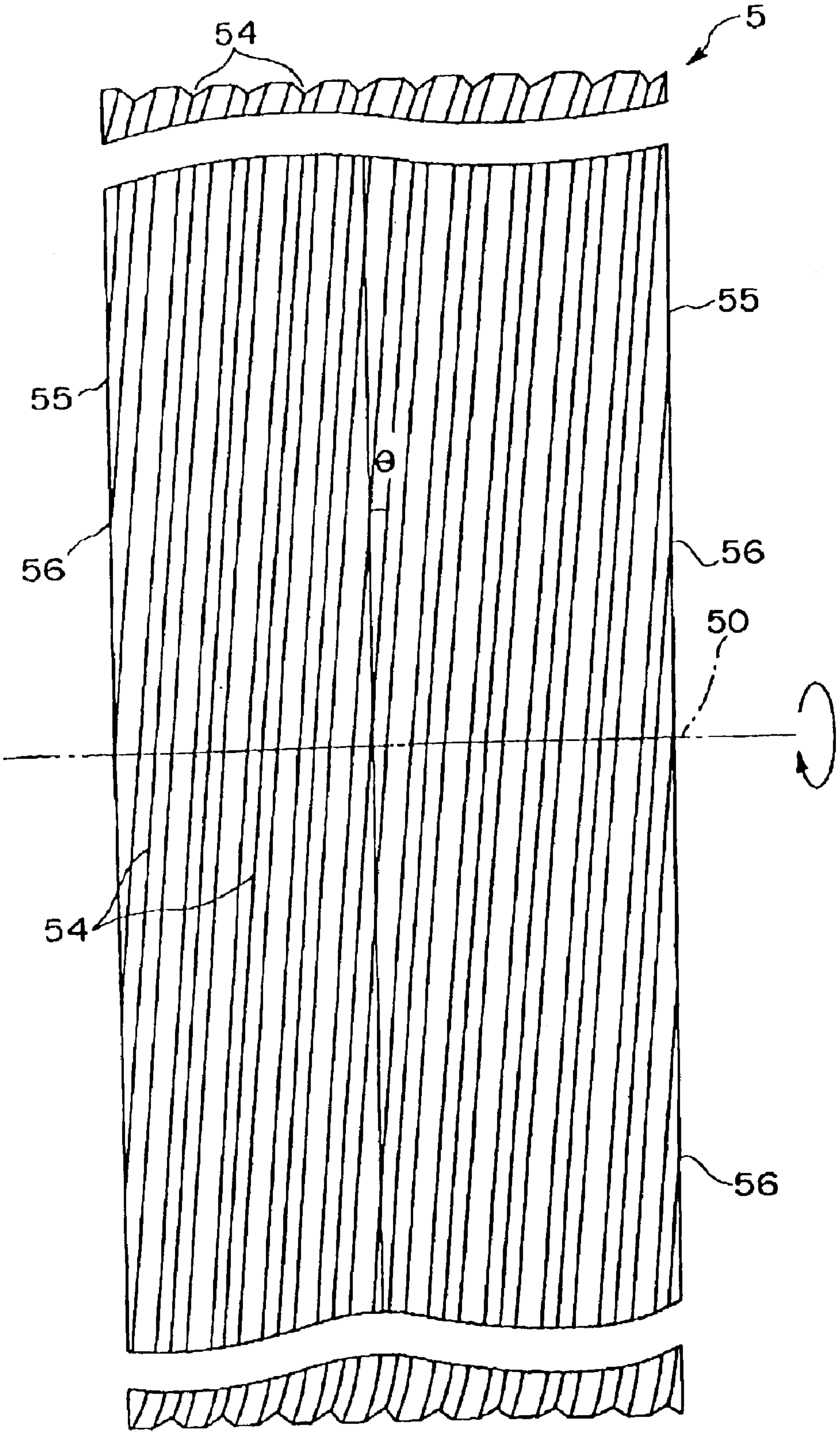
FIG. 12 is a front view which schematically shows a cooling roll used in a second embodiment of the manufacturing method according to the present invention.
Figure 13:
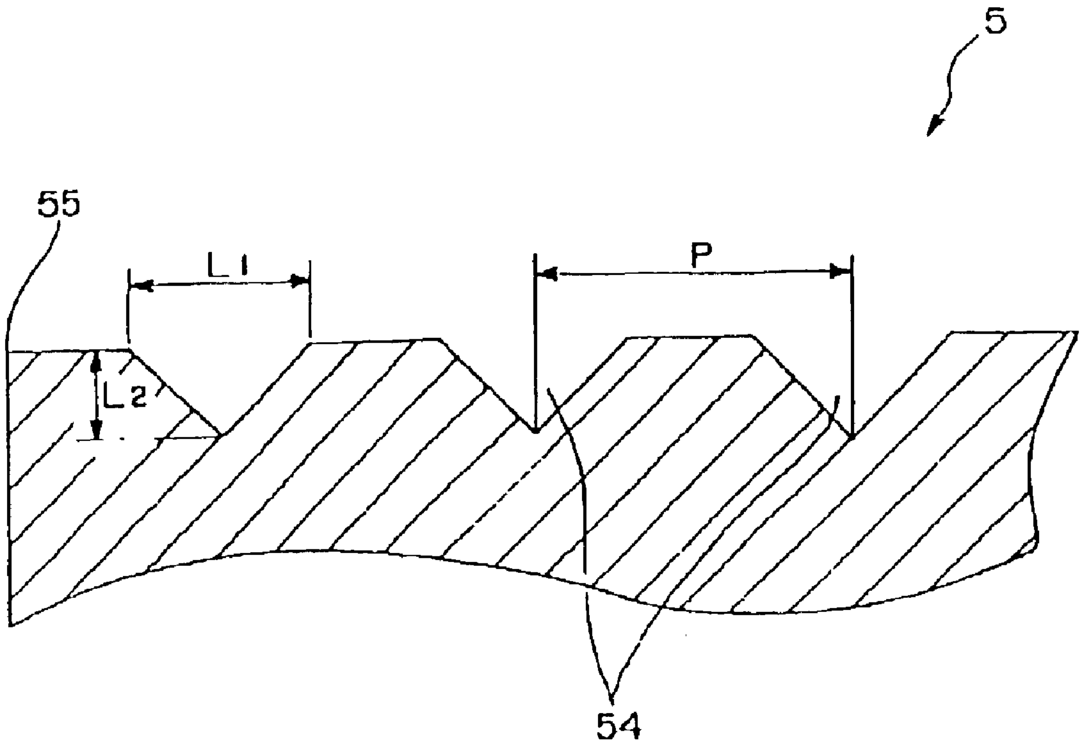
FIG. 13 is a sectional view which schematically shows the structure of a portion in the vicinity of the circumferential surface of the cooling roll shown in FIG. 12.

Next, the second embodiment of the manufacturing method of the magnetic powder according to the present invention will be described. In this regard, FIG. 12 is a front view which schematically shows a cooling roll used in the second embodiment of the magnetic powder manufacturing method of the present invention, and FIG. 13 is a sectional view which schematically shows the structure of a portion in the vicinity of the circumferential surface of the cooling roll 5 shown in FIG. 12. Hereinbelow, a description will be made with regard to the cooling roll 5 used in the second embodiment of the manufacturing method by focusing on different points between the cooling rolls of first and second embodiments, and explanation for the common points is omitted.

As shown in FIG. 12, the gas flow passages 54 are spirally formed with respect to the rotation axis 50 of the cooling roll 5. The gas flow passages 54 having such spiral forms can be formed relatively easily over the entire of the circumferential surface 53. For example, such gas flow passages 54 can be formed by cutting the outer circumferential portion of the cooling roll 5 with a cutting tool such as a lathe which is moved in a constant speed in parallel with the rotation axis 50 of the cooling roll 5 under the state that the cooling roll 5 is being rotated in a constant speed.

In this regard, it is to be understood that the number of the spiral gas flow passages may be one or more.

Further, the angle θ (absolute value) defined between the longitudinal direction of each gas flow passage 54 and the rotational direction of the cooling roll 5 should preferably be equal to or less than 30°, and more preferably equal to or less than 20°. If the angle θ is equal to or less than 30° the gas that has entered between the circumferential surface 53 and the puddle 7 can be expelled efficiently regardless of the peripheral velocity of the cooling roll 5.

Further, the angle θ may be changed so as to have the same value or different values depending on locations on the circumferential surface 53. Further, when the two or more gas flow passages 54 are formed, the angle θ may be changed in each of the gas flow passages 54.

In this embodiment, the ends of each gas flow passage 54 are formed into openings 56 opened at the opposite edge portions 55 of the circumferential surface 53 in the end surfaces of the cooling roll 5, respectively. This arrangement makes it possible to discharge the gas which has been expelled from between the circumferential surface 53 and the puddle 7 to the lateral sides of the cooling roll 5 through the openings 56, so that it is possible to effectively prevent the discharged gas from reentering between the circumferential surface 53 and the puddle 7 again. Although in the above example, each gas flow passage 54 has the openings 56 at the opposite ends thereof, such an opening may be provided at one of the ends thereof.

Figure 14:
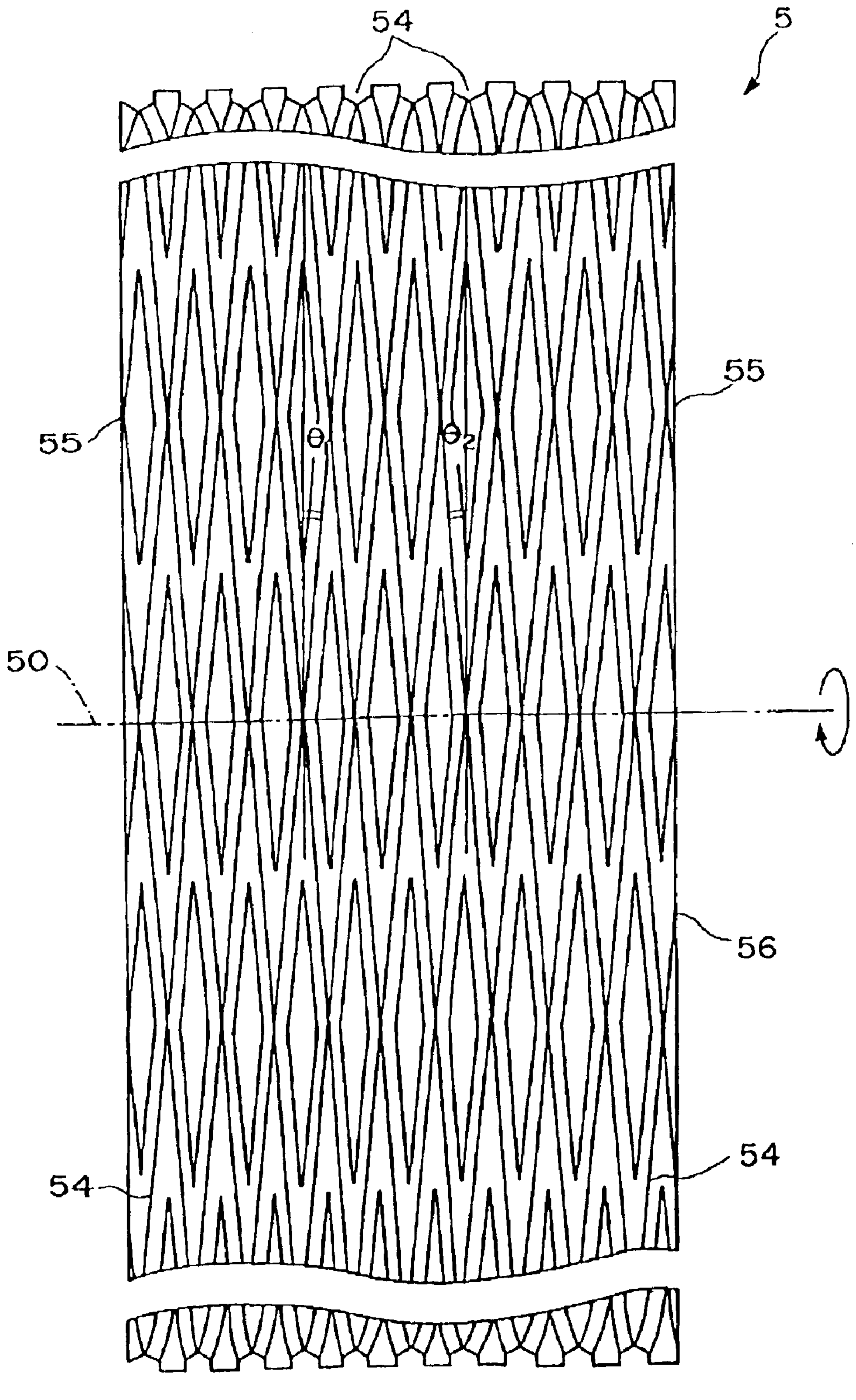
FIG. 14 is a front view which schematically shows a cooling roll used in a third embodiment of the manufacturing method according to the present invention.
Figure 15:
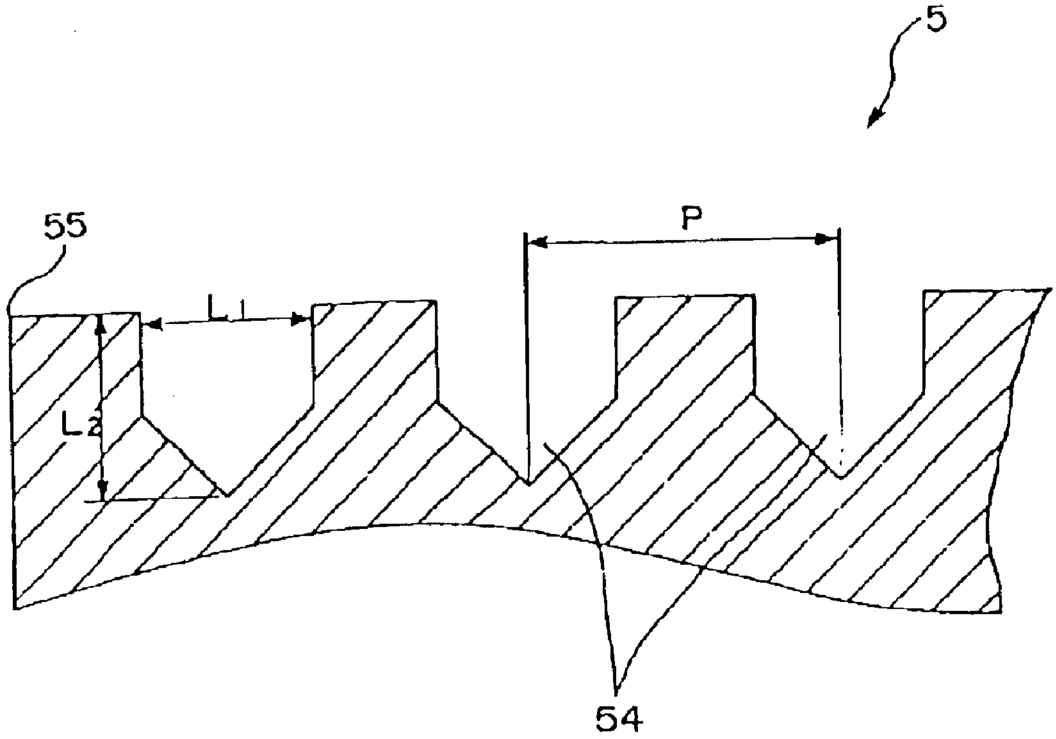
FIG. 15 is a sectional view which schematically shows the structure of a portion in the vicinity of the circumferential surface of the cooling roll shown in FIG. 14.

Next, the third embodiment of the manufacturing method of the magnetic powder according to the present invention will be described. In this regard, FIG. 14 is a front view which schematically shows a cooling roll used in the third embodiment of the magnetic powder manufacturing method of the present invention, and FIG. 15 is a sectional view which schematically shows the structure of a portion in the vicinity of the circumferential surface of the cooling roll 5 shown in FIG. 14. Hereinbelow, a description will be made with regard to the cooling roll 5 used in the third embodiment of the manufacturing method by focusing on different points between the cooling rolls of the third embodiment and the first and second embodiments, and explanation for the common points is omitted.

As shown in FIG. 14, in the circumferential surface 53, there are formed at least two spiral gas flow passages 54 of which spiral directions are different from each other so that these gas flow passages 54 intersect to each other at many locations.

In this embodiment, by forming such gas flow passages that are spiraled in the opposite directions, the melt spun ribbon 8 receives laterally exerted force from the dextral spirals as well as laterally exerted force from the sinistral spirals and these forces are cancelled with each other. Therefore, the lateral movement of the melt spun ribbon 8 in FIG. 14 is suppressed so that the advancing direction of the melt spun ribbon 8 becomes stable.

Further, it is preferred that the angles (absolute value) defined between each of the longitudinal directions of the gas flow passages 54 and the rotational direction of the cooling roll 5 (which are represented by $\theta_1$ and $\theta_2$ in FIG. 14) are in the same range as that of the angle θ described above with reference to the second embodiment.

Figure 16:
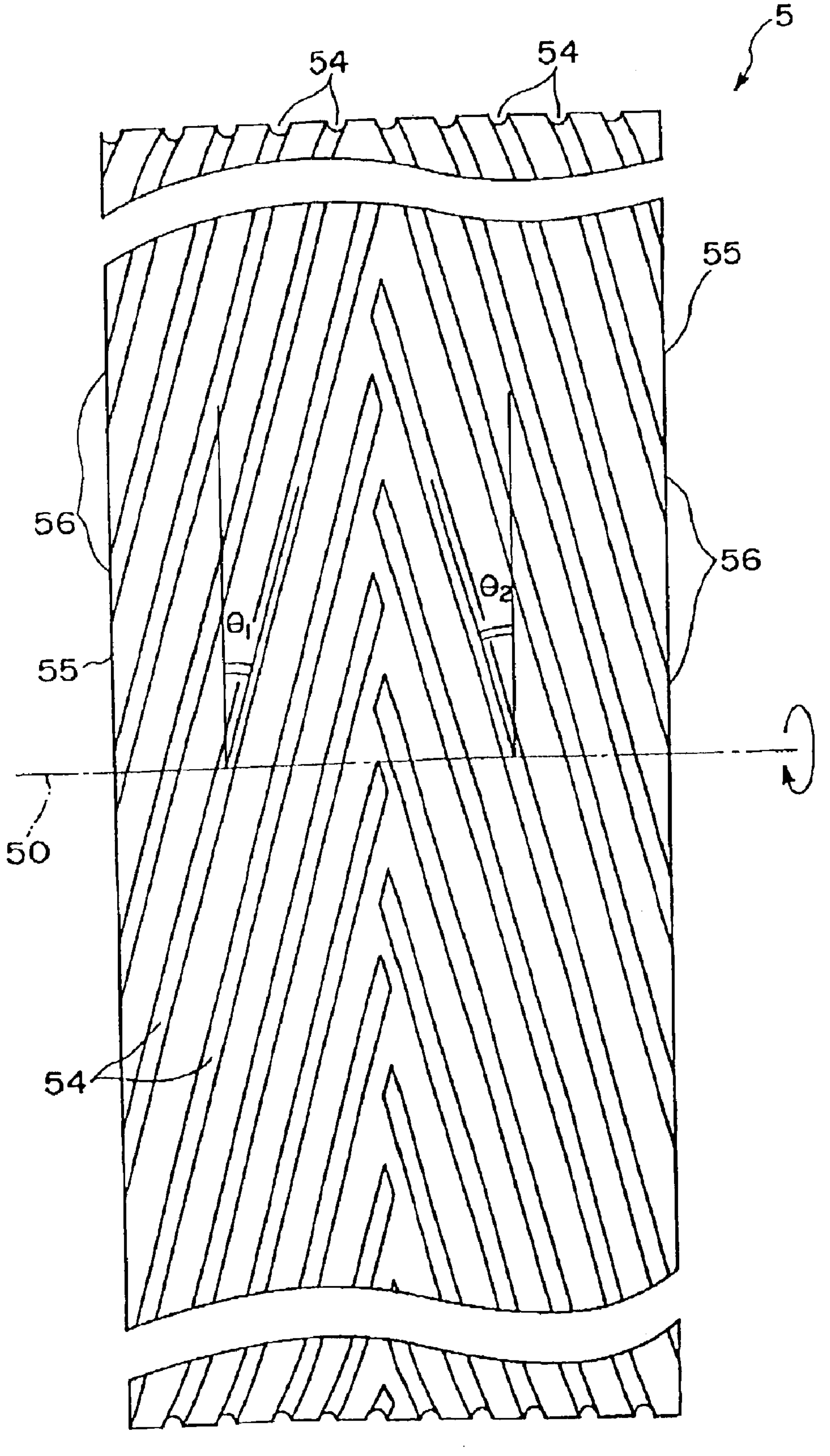
FIG. 16 is a front view which schematically shows a cooling roll used in a fourth embodiment of the manufacturing method according to the present invention.
Figure 17:
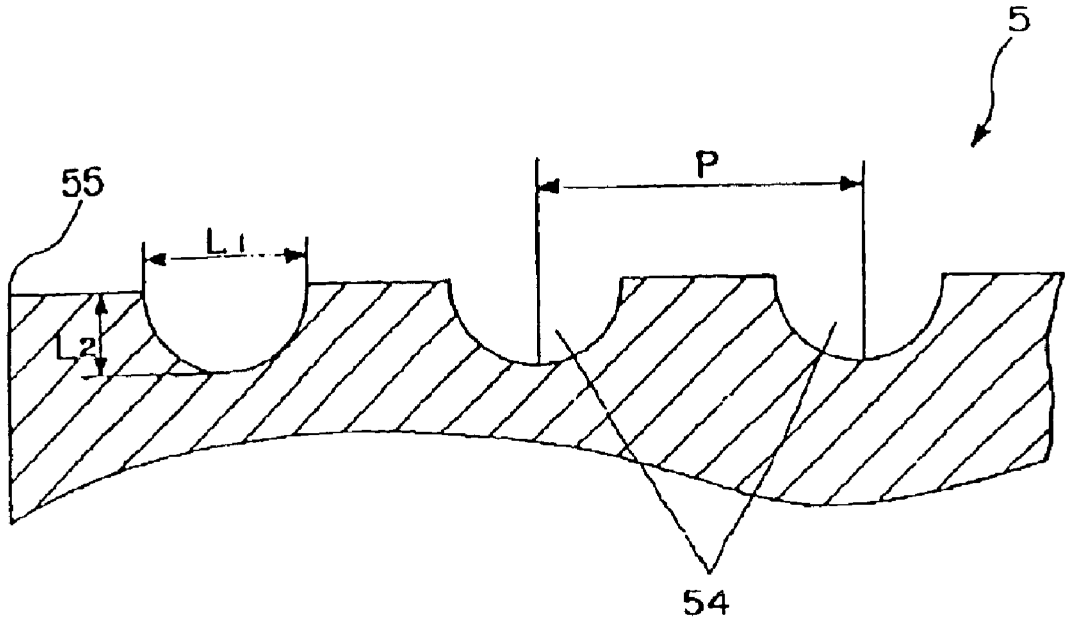
FIG. 17 is a sectional view which schematically shows the structure of a portion in the vicinity of the circumferential surface of the cooling roll of the fourth embodiment of the present invention.

Next, the fourth embodiment of the manufacturing method of the magnetic powder according to the present invention will be described. In this regard, FIG. 16 is a front view which schematically shows a cooling roll 5 used in the fourth embodiment of the magnetic powder manufacturing method of the present invention, and FIG. 17 is a sectional view which schematically shows the structure of a portion in the vicinity of the circumferential surface of the cooling roll 5 shown in FIG. 16. Hereinbelow, as is the same manner with the second and third embodiments, a description will be made with regard to the cooling roll 5 of the fourth embodiment by focusing on different points between the fourth embodiment and the first, second and third embodiments, and explanation for the common points is omitted.

As shown in FIG. 16, in this embodiment, a plurality of V-shaped gas flow passages each having a peak at the center of the axial direction of the cooling roll 5 and two extending grooves extending to the edges 55 of the circumferential surface 53.

When the cooling roll 5 having these gas flow passages 54 are used, it is possible to expel the gas entered between the circumferential surface 53 and the puddle 7 more effectively by appropriately arranging such gas flow passages with respect to the rotational direction of the cooling roll 5.

Further, when the cooling roll 5 having these gas flow passages 54 are used, the melt spun ribbon 8 receives laterally exerted force from the grooves located at one side thereof as well as laterally exerted force from the grooves located at the other side thereof, and these forces are balanced with each other. As a result, the melt spun ribbon 8 is adapted to be positioned at the center of the cooling roll 5 in the axial direction thereof so that the advancing direction of the melt spun ribbon 8 is stable.

Although the embodiments of the manufacturing method of the magnetic powder of the present invention were described above with reference to the cooling rolls used in the first to fourth embodiments, the structure of the gas flow passages 54 is not limited to those of the embodiments.

Figure 18:
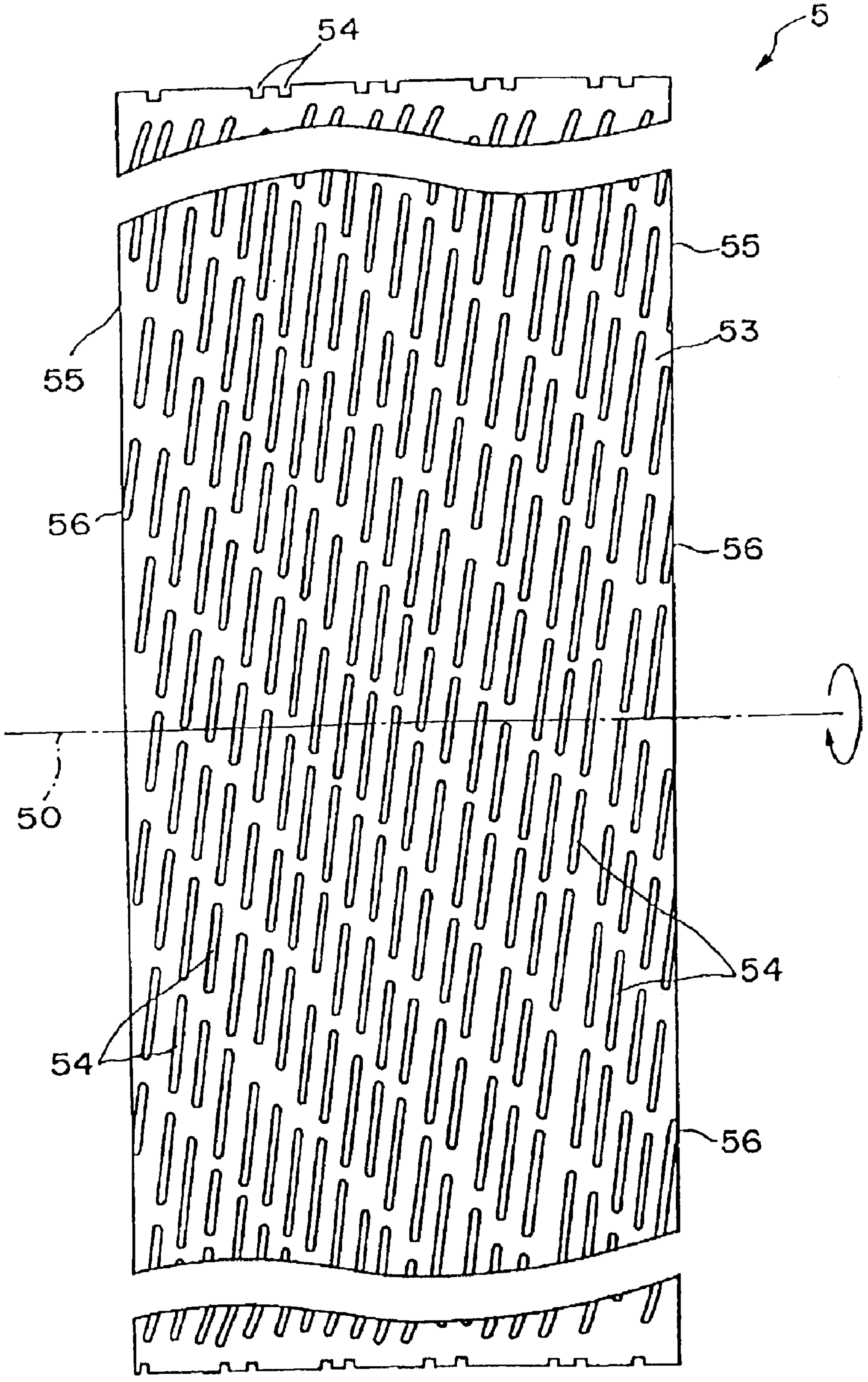
FIG. 18 is a sectional view which schematically shows a cooling roll used in other embodiment of the manufacturing method of the present invention.

For example, as shown in FIG. 18, the gas flow passages 54 of the present invention can be formed from a number of separate short slanting grooves 54. Further, the cross sectional shape of each groove 54 may be formed into one shown in FIG. 19 or FIG. 20.

Figure 19:
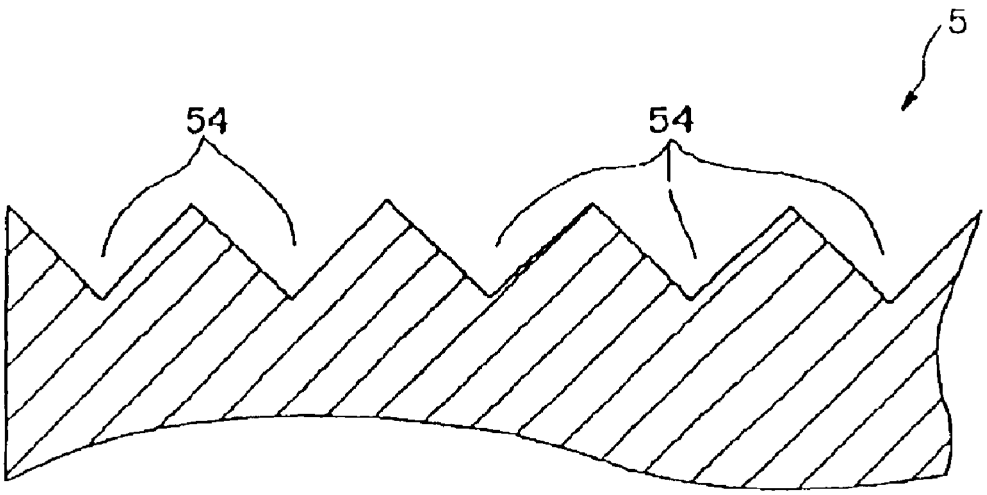
FIG. 19 is an illustration which schematically shows one variation of a gas flow passage formed in a circumferential surface of a cooling roll used the manufacturing method of the present invention.
Figure 20:
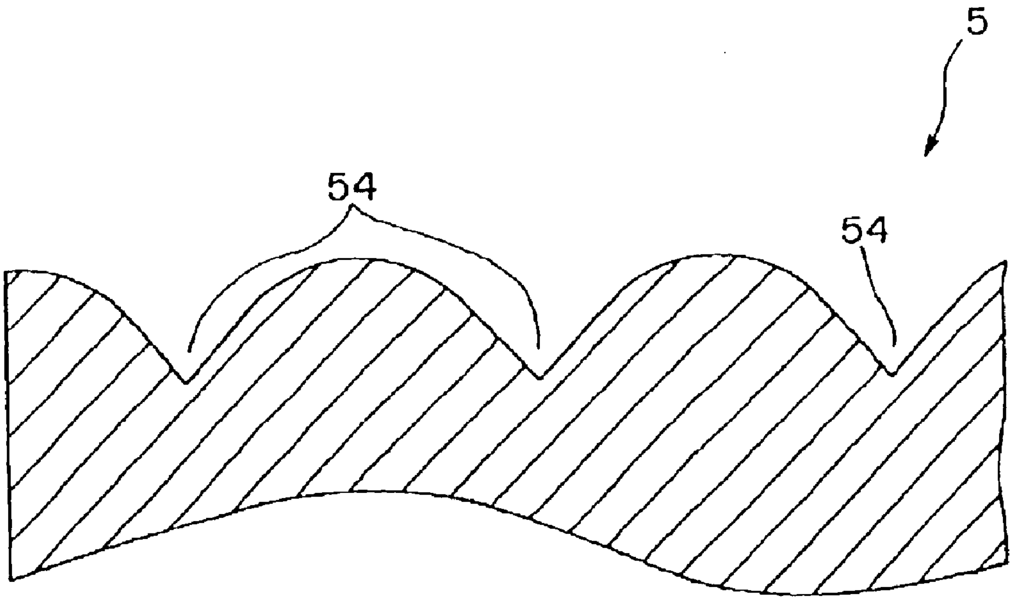
FIG. 20 is an illustration which schematically shows another variation of the gas flow passage formed in a circumferential surface of a cooling roll used in the manufacturing method of the present invention.
Figure 21:
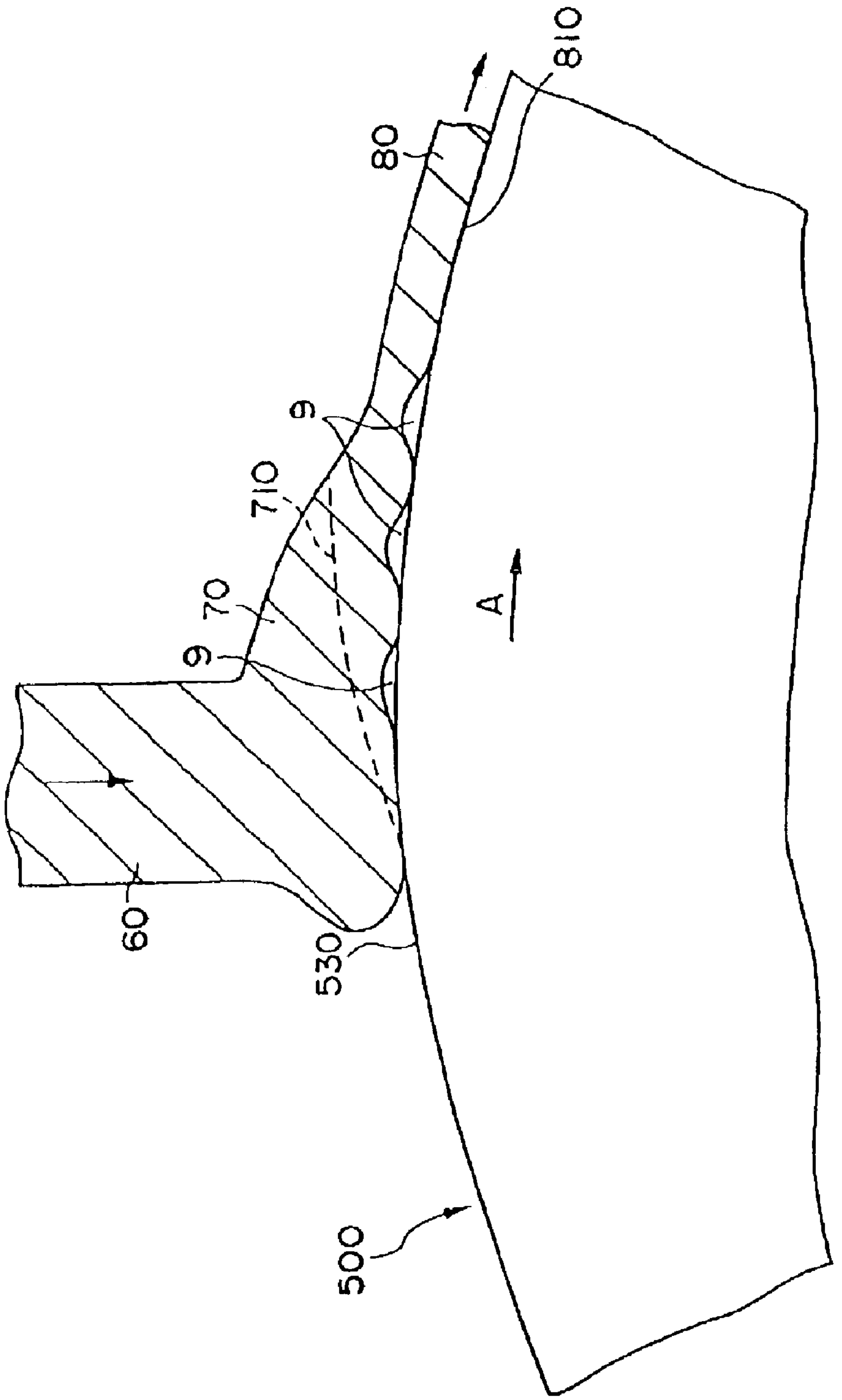
FIG. 21 is a sectional side view which schematically shows the situation caused at or around a colliding section of a molten alloy with a cooling roll in the conventional melt spinning apparatus which manufactures a ribbon-shaped magnetic material using a single roll method.

According to the cooling rolls 5 shown in FIGS. 18 to 20, it is also possible to obtain the same results as those of the first to fourth embodiments.

EXAMPLES

Hereinafter, actual examples of the present invention will be described.

Example 1

Magnetic powders were manufactured according to each of the following the manufacturing conditions (No. 1 to No. 10).

<Manufacturing Condition No. 1>

First, a roll base (having diameter of 200 mm and width of 30 mm) made of a copper (having heat conductivity of $395 W \cdot m^{-1} \cdot K^{-1}$ at a temperature of 20° C. and coefficient of thermal expansion (coefficient of linear expansion α) of $16.5 \times 10^{-6} K^{-1}$ at a temperature of 20° C.) was prepared, and then it was ground so as to have a mirror finishing outer circumferential surface with a surface roughness of Ra 0.07 μm.

Then, a plurality of grooves 54 which extend in parallel with the rotational direction of the roll base were formed by cutting.

Next, a surface layer of VN (a kind of ceramics) (having heat conductivity of $11.3 W \cdot m^{-1} \cdot K^{-1}$ at a temperature of 20° C. and coefficient of thermal expansion (coefficient of linear expansion α) of $9.2 \times 10^{-6} K^{-1}$ at a temperature of 20° C.) was formed onto the outer circumferential surface of the roll base by means of ion plating to obtain the cooling roll shown in FIGS. 1 to 3. In this cooling roll A, the thickness of the surface layer was 5 μm. Further, no machining work was performed for the surface layer after formation thereof.

By using the melt spinning apparatus 1 having thus obtained cooling roll 5, melt spun ribbons made of an alloy having an alloy composition represented by the formula of $(Nd_{0.77}Pr_{0.18}Dy_{0.05})_{8.9}Fe_{bal.}CO_{8.2}B_{5.5}$ were manufactured in accordance with the following method.

First, an amount (basic weight) of each of the materials Nd, Pr, Dy, Fe, Co and B was measured, and then a mother alloy ingot was manufactured by casting these materials.

Next, the mother alloy ingot was put into a crystal tube having a nozzle (circular orifice) 3 at the bottom thereof of the melt spinning apparatus 1. Thereafter, a chamber in which the melt spinning apparatus 1 is installed was vacuumed, and then an inert gas (Helium gas) was introduced to create a desired atmosphere of predetermined temperature and pressure.

Next, the mother alloy ingot in the crystal tube was melt by heating it by means of high frequency inductive heating. Then, under the conditions that the peripheral velocity of the cooling roll 5 was set to be a predetermined velocity, the injection pressure (that is, the differential pressure between the ambient pressure and the summed pressure of the internal pressure of the crystal tube and the pressure applied to the surface of the liquid in the tube which is in proportion to the liquid level) of the molten alloy 6 was set to be 40 kPa, and the pressure of the ambient gas was set to be 60 kPa, the molten alloy 6 was injected toward the apex of the circumferential surface 53 of the cooling roll 5 from just above the rotational axis of the cooling roll 5, to manufacture a melt spun ribbon 8 in a continuous manner. In this case, several lots of melt spun ribbons were manufactured by changing the peripheral velocity of the cooling roll 5 in various ways.

Thus obtained melt spun ribbons were subjected to a heat treatment in the argon gas atmosphere at a temperature of 680° C. for 5 minutes. Then, the magnetic properties of each of the melt spun ribbons were measured using a vibrating sample magnetometer (VSM). In the measurement, the magnetic field was applied along the major axis of the respective melt spun ribbons. However, no demagnetization correction was performed. After the measurement of the magnetic properties of the melt spun ribbons, the lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

In this case, it was confirmed that the shape or form (pattern) of the circumferential surface of the cooling roll was transferred to the roll contact surface of each melt spun ribbon during the magnetic powder manufacturing process and thereby the roll contact surface was formed with ridges or recesses.

<Manufacturing Condition No. 2>

A cooling roll B having the same configuration as that of the cooling roll A excepting that the shape and form of the grooves were formed into those shown in FIGS. 12 and 13 was manufactured in accordance with the same manner. In this cooling roll B, the formation of the grooves was performed in the following manner. Namely, three sets of grooves were formed using a lathe having three cutting tools arranged so as to have the same interval so that the adjacent grooves Then, several lots of the melt spun ribbons were manufactured in the same manner as the manufacturing condition No. 1 excepting that the cooling roll B was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, the lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 3>

A cooling roll C having the same configuration as that of the cooling roll B excepting that the shape and form of the grooves were formed into those shown in FIGS. 14 and 15 was manufactured in accordance with the same manner.

Then, several lots of the melt spun ribbons were manufactured in the same manner as the manufacturing condition No. 1 excepting that the cooling roll C was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, the lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 4>

A cooling roll D having the same configuration as that of the cooling roll B excepting that the shape and form of the grooves were formed into those shown in FIGS. 16 and 17 was manufactured in accordance with the same manner.

Then, several lots of the melt spun ribbons were manufactured in the same manner as the manufacturing condition No. 1 excepting that the cooling roll D was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, the lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 5>

A cooling roll E having the same configuration as that of the cooling roll B excepting that the structural material of the surface layer was TiN having heat conductivity of $29.4 W \cdot m^{-1} \cdot K^{-1}$ at a temperature of 20° C. and coefficient of thermal expansion (coefficient of linear expansion α) of $9.3 \times 10^{-6} K^{-1}$ at a temperature of 20° C.

Then, several lots of the melt spun ribbons were manufactured in the same manner as the manufacturing condition No. 1 excepting that the cooling roll E was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, a lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 6>

A cooling roll F having the same configuration as that of the cooling roll B excepting that the structural material of the surface layer was ZrN having heat conductivity of $16.8W \cdot m^{-1} \cdot K^{-1}$ at a temperature of 20° C. and coefficient of thermal expansion (coefficient of linear expansion α) of $7.2 \times 10^{-6} K^{-1}$ at a temperature of 20° C.

Then, several lots of the melt spun ribbons were manufactured in the same manner as the manufacturing condition No. 1 excepting that the cooling roll F was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, a lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 7>

A cooling roll C having the same configuration as that of the cooling roll B excepting that the structural material of the surface layer was TiC having heat conductivity of $25.2W \cdot m^{-1} \cdot K^{-1}$ at a temperature of 20° C. and coefficient of thermal expansion (coefficient of linear expansion α) of $8.0 \times 10^{-6} K^{-1}$ at a temperature of 20° C.

Then, several lots of the melt spun ribbons were manufactured in the same manner as the manufacturing condition No. 1 excepting that the cooling roll G was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, a lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 8>

A cooling roll H having the same configuration as that of the cooling roll B excepting that the structural material of the surface layer was ZrC having heat conductivity of $20.6W \cdot m^{-1} K^{-1}$ at a temperature of 20° C. and coefficient of thermal expansion (coefficient of linear expansion α) of $7.0 \times 10^{-6} K^{-1}$ at a temperature of 20° C.

Then, several lots of the melt spun ribbons were manufactured in the same manner as the manufacturing condition No. 1 excepting that the cooling roll H was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, a lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

<Manufacturing Condition No. 9: Comparative Example>

A roll base (having diameter of 200 mm and width of 30 mm) made of a copper (having heat conductivity of $395W \cdot m^{-1} \cdot K^{-1}$ at a temperature of 20° C. and coefficient of thermal expansion (coefficient of linear expansion α) of $16.5 \times 10^{-6} K^{-1}$ at a temperature of 20° C.) was prepared, and then it was ground so as to have a mirror finishing outer circumferential surface with a surface roughness of Ra 0.07 μm.

Then, a surface layer of VN (having heat conductivity of $11.3W \cdot m^{-1} \cdot K^{-1}$ at a temperature of 20° C. and coefficient of thermal expansion (coefficient of linear expansion α) of $9.2 \times 10^{-6} K^{-1}$ at a temperature of 20° C.) was formed onto the outer circumferential surface of the roll base by means of ion plating to obtain a cooling roll I. In this cooling roll I, no grooves were formed in the circumferential surface of the cooling roll.

Then, several lots of the melt spun ribbons were manufactured in the same manner as the manufacturing condition No. 1 excepting that the cooling roll I was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, a lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

In this manufacturing condition, it was confirmed that no ridges or recesses were formed in the roll contact surface of each melt spun ribbon during the magnetic powder manufacturing process, but instead thereof presence of a large number of huge dimples each having an area more than 2000 $\mu m^2$ was confirmed.

<Manufacturing Condition No. 10: Comparative Example>

A roll base (having diameter of 200 mm and width of 30 mm) made of a copper (having heat conductivity of $395 W \cdot m^{-1} \cdot K^{-1}$ at a temperature of 20° C. and coefficient of thermal expansion (coefficient of linear expansion α) of $16.5 \times 10^{-6} K^{-1}$ at a temperature of 20° C.) was prepared, and then it was ground so as to have a mirror finishing outer circumferential surface with a surface roughness of Ra 0.07 μm.

Then, another cutting process was made to the roll base to form a plurality of grooves (acting as gas flow passages) which extend in parallel with the rotational direction of the cooling roll. The average pitch of the adjacent grooves was 120 μm. Thus obtained cooling roll was call as the cooling roll J.

Then, several lots of the melt spun ribbons were manufactured in the same manner as the manufacturing condition No. 1 excepting that the cooling roll J was used instead of the cooling roll A. Thus obtained melt spun ribbons were subjected to a heat treatment in the argon gas atmosphere at a temperature of 680° C. for 5 minutes. Then, the magnetic properties of each of the melt spun ribbons were measured in the same manner as the manufacturing condition No. 1. After the measurement of the magnetic properties of the melt spun ribbons, a lot of the melt spun ribbons having the most excellent magnetic properties was selected, and then the selected melt spun ribbons were milled and subjected to a heat treatment at a temperature of 650° C. for 4 minutes, to obtain magnetic powders having the average particle size of 70 μm.

Further, in this manufacturing condition, it was also confirmed that the shape or form of the circumferential surface of the cooling roll was transferred to the roll contact surface of each melt spun ribbon during the magnetic powder manufacturing process and thereby the roll contact surface was formed with ridges or recesses.

Thereafter, in each of these cooling rolls used in the manufacturing conditions No. 1 to No. 10, the width $L_1$ of each gas flow passage (average value), the depth $L_2$ of each gas flow passage (average value), the pitch P (average value) of the adjacent gas flow passages, the angle θ defined between the longitudinal direction of each gas flow passage and the rotational direction of the cooling roll, the ratio of the projected area of the gas flow passages with respect to the projected area of the circumferential surface of the cooling roll, and the surface roughness Ra of apart of the circumferential surface other than a part of the gas flow passages were measured, and the measured values thereof are shown in the attached TABLE 1. In addition, in each of the manufacturing conditions No. 1 to No. 10, the peripheral velocity of the cooling roll at which the melt spun ribbons having the most excellent magnetic properties could be obtained is also shown.

Further, for each of the magnetic powders, the height and length of the ridges formed on the surface of the particle and the pitch between the adjacent ridges were measured. Further, based on the observation results by the scanning electron microscope (SEM), a ratio of the area of a part of the surface of the particle where the ridges or recesses are formed with respect to the entire surface area of the particle was also obtained for each of the magnetic powders. These results are shown in the attached Table 2.

Furthermore, to analyze the phase structure of the obtained magnetic powders, the respective magnetic powders were subjected to an X-ray diffraction test using Cu-Kα line at the diffraction angle (2θ) of 20°–60°. With this result, from the diffraction pattern of the respective magnetic powders, it was confirmed that there were a diffraction peak of a hard magnetic phase of $R_2(Fe.Co)_{14}B$ phase and a diffraction peak of a soft magnetic phase of α-(Fe, Co) phase. Further, from the observation results by the transmission electron microscope (TEM), the respective magnetic powders have a composite structure (nanocomposite structure). Furthermore, in each of the magnetic powders, an average crystal grain size of each of these phases was also measured. These measured values are shown in the attached Table 2.

Moreover, for each of the magnetic powders, magnetic properties thereof were also measured using a vibrating sample magnetometer (VSM). The remanent magnetic flux density Br(T), the coercive force $H_{cj}$ (kA/m) and the maximum energy product $(BH)_{max}$ ($kJ/m^3$) of the respective magnetic powders are shown in the attached Table 3.

As seen from the attached Table 3, all of the magnetic powders manufactured under the manufacturing conditions No. 1 to No. 8 (according to the present invention) have excellent magnetic properties. This is supposed to result from the following reasons.

Namely, each of the cooling rolls A to H used in the manufacturing conditions No. 1 to No. 8 had the gas flow passages acting as the gas expelling means on its circumferential surface. Therefore, in each of the manufacturing processes using these cooling rolls A to H, gas which entered between the puddle and the circumferential surface was effectively expelled so that the puddle could be sufficiently and reliably in contact with the circumferential surface, thereby enabling to prevent or suppress formation of huge dimples on the roll contact surface of the melt spun ribbon. Consequently, the difference in the cooling rates at the various portions of the melt spun ribbon can be made small. Further, in each of these cooling rolls, the average pitch P[μm] of the gas flow passages formed on the circumferential surface was determined so as to satisfy the relationship of P<D with respect to the average particle size D[μm] of the magnetic powder. With these results, the particles of the respective magnetic powder had small structural difference (that is, only small dispersion in their crystal grain sizes), and therefore dispersion in the magnetic properties was also small in each of the particles. It is believed that, for these reasons, each of the magnetic powders according to the present invention had improved magnetic properties as a whole as described above.

In contrast, the magnetic powders manufactured under the manufacturing conditions No. 9 and No. 10 (Comparative Examples) had only poor magnetic properties. This is supposed to result from the following reasons.

Namely, the cooling roll I used in the manufacturing condition No. 9 had no gas flow passages on its circumferential surface. Therefore, in the manufacturing process using the cooling roll I, the puddle could not be sufficiently and reliably in contact with the circumferential surface of the cooling roll, so that gas was liable to enter between the puddle and the circumferential surface. In this melt spun ribbon, the gas which has entered between the puddle and the circumferential surface remained as it is to form huge dimples on the roll contact surface of the melt spun ribbon. Therefore, while a portion of the roll contact surface which was in contact with the circumferential surface had a relatively high cooling rate, a portion of the roll contact surface where such dimples were formed had a lower cooling rate so that the crystal grain size at that portion became coarse. It is believed that this causes the large dispersion in the magnetic properties of the obtained melt spun ribbon, and therefore the magnetic powder obtained by milling the melt spun ribbon had the poor magnetic properties as a whole.

Further, the cooling roll J used in the manufacturing condition No. 10 had the gas flow passages. Therefore, in the manufacturing process of the melt spun ribbon using the cooling roll J, it is believed that the puddle could be sufficiently and reliably in contact with the circumferential surface of the cooling roll. However, in the magnetic powder obtained by milling this melt spun ribbon, the average particle size D[$\mu$m] of the magnetic powder was smaller than the average pitch P[$\mu$m] of the gas flow passages, so that there were structural differences among the particles of the magnetic powder (that is, there was large dispersion in the crystal grain sizes of these particles). It is believed that this causes the large dispersion in the magnetic properties of the particles of the magnetic powder ribbon, and therefore the magnetic powder had the poor magnetic properties as a whole.

Example 2

Next, each of the magnetic powders obtained in the Example 1 was mixed with an epoxy resin and a small amount of hydrazine-based antioxidant at a temperature of 100° C. for 10 minutes, to obtain compositions for bonded magnets (compounds).

In this case, in each compound, the mixing ratio (parts by weight) of the magnetic powder, the epoxy resin and the hydrazine-based antioxidant was 97.5 wt %, 1.3 wt % and 1.2 wt %, respectively.

Thereafter, each of the thus obtained compounds was milled or crushed to be granular. Then, the granular substance (particle) was weighed and filled into a die of a press machine, and then it was subjected to a compaction molding (in the absence of a magnetic field) at a temperature of 120° C. and under the pressure of 600 Mpa, to obtain a mold body. After the mold body was cooled and then removed from the die, the epoxy resin was hardened by heating at a temperature of 175° C. to obtain a bonded magnet of a columnar shape having a diameter of 10 mm and a height of 7 mm (for use in tests for measuring magnetic properties and heat resistance). Further, a bonded magnet of a flat plate-shape having a cross section of 10 mm ×10 mm and a height of 7 mm (for use in test for measuring mechanical strength). For the flat plate-shaped bonded magnet, five samples were manufactured in each of the magnetic powders.

The bonded magnets according to the manufacturing conditions No. 1 to No. 8 (present invention) could be manufactured with good moldability.

Next, after pulse magnetization was performed for each of the columnar shape bonded magnets under the magnetic field strength of 3.2 MA/m, magnetic properties (coercive force $H_{CJ}$, remanent magnetic flux density Br and maximum magnetic energy product $(BH)_{max}$) were measured using a DC recording fluxmeter (manufactured and sold by Toei Industry Co. Ltd with the product code of TRF-5BH) under the maximum applied magnetic field of 2.0 MA/m. The temperature at the measurement was 23° C. (that is, room temperature).

In addition, for each of the columnar bonded magnets, a test for heat resistance (heat stability) was performed. In this heat resistance test, each bonded magnet was being placed under the condition at a temperature of 100° C. for one hour, and then the temperature was lowered to the room temperature and the irreversible flux loss (initial flux loss) at that time was measured and evaluated. In this regard, it is to be noted that lower absolute value of the irreversible flux loss (initial flux loss) is more excellent heat resistance (heat stability).

Further, for each of the flat plate-shaped bonded magnets, mechanical strength was measured through the shear strength by punching-out test. As a testing machine for this test, an autograph manufactured by Simadzu Corporation was used, in which a punch (having an outer diameter of 3 mm) was used and the shearing speed was 11.0 mm/min.

Furthermore, after the measurement of the mechanical strength, a cross-sectional surface of each bonded magnet was observed using a scanning electron microscope (SEM). As a result, it has been confirmed that in each of the bonded magnets manufactured according to the manufacturing conditions No. 1 to No. 8 (present invention), the recesses between the ridges were effectively filled with the binding resin in each particle thereof.

The results of the measurements of the magnetic properties, the heat resistance test and the measurement of the mechanical strength are shown in the attached TABLE 4.

As seen from TABLE 4 all of the bonded magnets manufactured according to the manufacturing conditions No. 1 to No. 8 (present invention) have excellent magnetic properties, heat resistance and mechanical strength. While the bonded magnets manufactured according to the manufacturing conditions No. 9 to No. 10 (comparative example) have poor magnetic properties. Further, in the bonded magnet manufactured according to the manufacturing condition No. 9, the mechanical strength is also low. This is supposed to result from the following reasons.

Namely, since the bonded magnets by the manufacturing conditions No. 1 to No. 8 were manufactured using the magnetic powders obtained from the melt spun ribbons having excellent magnetic properties (with less dispersion thereof), respectively, the bonded magnets manufactured using these magnetic powders could have the excellent magnetic properties. Further, in each of these magnetic powders, the particles were formed with the ridges, and the recesses between the ridges were effectively filled with the binding resin when formed into the bonded magnet. Therefore, the bonding strength between the magnetic powder and the binding resin was increased, so that the high mechanical strength was obtained with the use of the relatively small amount of the binding resin. Further, the use of the relatively small amount of the binding resin in turn increased the density of the bonded magnet, and as a result thereof the magnetic properties were enhanced.

In contrast, the bonded magnets according to the manufacturing conditions No. 9 and No. 10 (Comparative Examples) were manufactured from the magnetic powders obtained from the melt spun ribbons having the poor magnetic properties. Therefore, the magnetic properties of the bonded magnets were also poor. Further, since the bonded magnet according to the manufacturing condition No. 9 was manufacturing using the magnetic powder comprised of the particles having no ridges or recesses thereon, the bonding strength between the magnetic powder and the binding resin was relatively low as compared with the bonded magnets of the present invention and, as a result thereof, the mechanical strength was low.

As described above, according to the present invention, the following effects are realized.

Since the gas flow passages (gas expelling means) are provided on the circumferential surface of the cooling roll, the puddle can be sufficiently and reliably in contact with the circumferential surface so that high magnetic properties can be obtained stably.

Further, since the average pitch P[$\mu$m] of the gas flow passages formed on the circumferential surface of the cooling roll is determined so as to satisfy the relationship of $P<D$ with respect to the average particle size D[$\mu$m] of the magnetic powder, the particles of the magnetic powder have small dispersion in their crystal grain sizes and, as a result thereof, the magnetic powder according to the present invention can have improved magnetic properties as a whole.

Furthermore, by appropriately selecting the structural material and the thickness of the surface layer and setting the shape and form of the gas expelling means, it is possible to obtain more excellent magnetic properties.

Further, since the magnetic powder is constituted from a composite structure having a soft magnetic phase and a hard magnetic phase, the magnetic powder can have high magnetizability and exhibit excellent magnetic properties. According to the present invention, coercive force and heat resistance are particularly enhanced.

Furthermore, since high magnetic flux density can be obtained, it is possible to manufacture bonded magnets having high magnetic properties even if they are isotropic bonded magnets. In particular, according to the present invention, magnetic performance equivalent to or more excellent than that of the conventional isotropic bonded magnet can be obtained with a smaller size bonded magnet, it is possible to manufacture high performance smaller size motors.

In addition, since the magnetic powder includes the particles each having the ridges or recesses formed on at least a part of the surfaces thereof, the bonding strength between the magnetic powder and the binding resin is further improved, thereby enabling to obtain bonded magnets having high mechanical strength.

Moreover, since bonded magnets having high mechanical strength can be obtained with good moldability even though a relatively small amount of binding resin is used, it becomes possible to increase an amount of the magnetic powder (content of the magnetic powder) and it is also possible to reduce the void ratio, and, with these results, bonded magnets having excellent magnetic properties cane be obtain.

Since the bonding strength between the magnetic powder and the binding resin is high, high corrosion resistance can be obtained even in the high density bonded magnets.

Moreover, since the magnetizability of the bonded magnet according to this invention is excellent, it is possible to magnetize the magnet with a lower magnetizing field. In particular, multipolar magnetization or the like can be accomplished easily and reliably, and further a high magnetic flux density can be also obtained.

Finally, it is to be understood that the present invention is not limited to the embodiments and examples described above, and many changes or additions may be made without departing from the scope of the invention which is determined by the following claims.

TABLE 1

Conditions of Cooling Rolls

| Manufacturing Condition No. | Cooling Roll | Average Width $L_1$ (μm) | Average Depth $L_2$ (μm) | $L_1/L_2$ | Average Pitch P (μm) | Angle θ | Ratio of Area Occupied by Gas Flow Passages (%) | Surface Roughness Ra (μm) | Peripheral Velocity (m/sec) |
|---|---|---|---|---|---|---|---|---|---|
| No. 1 (This Invention) | A | 9.2 | 3.2 | 2.9 | 10.0 | 0° | 92 | 0.15 | 33 |
| No. 2 (This Invention) | B | 5.0 | 5.0 | 1.0 | 12.5 | 3° | 40 | 0.20 | 27 |
| No. 3 (This Invention) | C | 9.5 | 2.5 | 3.8 | 15.0 | $\theta_1 = 15°$<br>$\theta_2 = 15°$ | 63 | 0.14 | 28 |
| No. 4 (This Invention) | D | 20.0 | 4.5 | 4.4 | 30.0 | $\theta_1 = 10°$<br>$\theta_2 = 18°$ | 67 | 0.22 | 30 |
| No. 5 (This Invention) | E | 15.0 | 1.8 | 8.3 | 30.0 | 5° | 50 | 0.20 | 21 |
| No. 6 (This Invention) | F | 6.4 | 3.2 | 2.0 | 8.0 | 20° | 80 | 0.18 | 26 |
| No. 7 (This Invention) | G | 9.2 | 1.5 | 6.1 | 10.0 | 10° | 92 | 0.10 | 31 |
| No. 8 (This Invention) | H | 20.0 | 1.8 | 11.1 | 30.0 | 15° | 67 | 0.12 | 18 |
| No. 9 (Comp. Ex.) | I | — | — | — | — | — | — | 0.09 | 21 |
| No. 10 (Comp. Ex.) | J | 12.0 | 2.0 | 6.0 | 120.0 | 0° | 10 | 0.08 | 12 |

TABLE 2

Various Measurement Values for Respective Magnetic Powders

| Manufacturing Condition No. | Average Particle Size D (μm) | Average Height of Ridges (μm) | Average Length of Ridges (μm) | Average Pitch of Adjacent Ridges (μm) | Ratio of Area Where Ridges or Pecesses Are Formed in Each Particle in the Magnetic Powder with Respect to the Total Area of the Particle (%) | Average Crystal Grain Size (nm) Hard Magnetic Phase | Average Crystal Grain Size (nm) Soft Magnetic Phase |
|---|---|---|---|---|---|---|---|
| No. 1 (This Invention) | 70 | 1.8 | 35 | 10.0 | 85 | 25 | 14 |
| No. 2 (This Invention) | 70 | 3.7 | 50 | 12.5 | 37 | 34 | 24 |
| No. 3 (This Invention) | 70 | 1.0 | 29 | 15.0 | 52 | 30 | 20 |
| No. 4 (This Invention) | 70 | 2.2 | 44 | 30.0 | 60 | 31 | 19 |
| No. 5 (This Invention) | 70 | 0.9 | 19 | 30.0 | 45 | 36 | 27 |
| No. 6 (This Invention) | 70 | 1.7 | 31 | 8.0 | 73 | 40 | 30 |
| No. 7 (This Invention) | 70 | 0.6 | 8 | 10.0 | 86 | 26 | 15 |
| No. 8 (This Invention) | 70 | 0.8 | 15 | 30.0 | 60 | 43 | 32 |
| No. 9 (Comp. Ex.) | 70 | — | — | — | — | 60 | 48 |
| No. 10 (Comp. Ex.) | 70 | 1.0 | 28 | 120.0 | 8 | 55 | 47 |

TABLE 3

Magnetic Properties of the Respective Magnetic Powders

| Manufacturing Condition No. | $H_{CJ}$ (kA/m) | Br (T) | $(BH)_{max}$ (kJ/m$^3$) |
|---|---|---|---|
| No. 1 (This Invention) | 573 | 1.05 | 160 |
| No. 2 (This Invention) | 561 | 1.02 | 151 |
| No. 3 (This Invention) | 568 | 1.03 | 155 |

TABLE 3-continued

Magnetic Properties of the Respective Magnetic Powders

| Manufacturing Condition No. | $H_{CJ}$ (kA/m) | Br (T) | $(BH)_{max}$ ($kJ/m^3$) |
|---|---|---|---|
| No. 4 (This Invention) | 577 | 1.03 | 157 |
| No. 5 (This Invention) | 572 | 1.01 | 149 |
| No. 6 (This Invention) | 546 | 0.97 | 140 |
| No. 7 (This Invention) | 564 | 1.04 | 158 |
| No. 8 (This Invention) | 549 | 0.96 | 136 |
| No. 9 (Comp. Ex.) | 243 | 0.78 | 68 |
| No. 10 (Comp. Ex.) | 195 | 0.73 | 62 |

TABLE 4

Various Measurement Values for Respective Bonded Magnets

| Manufacturing Condition No. | $H_{CJ}$ (kA/m) | Br (T) | $(BH)_{max}$ ($kJ/m^3$) | Irreversible Flux Ross (%) | Mechanical Strength (MPa) |
|---|---|---|---|---|---|
| No. 1 (This Invention) | 570 | 0.90 | 123 | −1.9 | 92 |
| No. 2 (This Invention) | 558 | 0.87 | 115 | −2.7 | 78 |
| No. 3 (This Invention) | 566 | 0.87 | 116 | −2.2 | 83 |
| No. 4 (This Invention) | 574 | 0.88 | 119 | −1.8 | 85 |
| No. 5 (This Invention) | 569 | 0.85 | 110 | 3‘2.0 | 80 |
| No. 6 (This Invention) | 543 | 0.84 | 100 | −3.1 | 89 |
| No. 7 (This Invention) | 561 | 0.88 | 121 | −2.4 | 93 |
| No. 8 (This Invention) | 546 | 0.83 | 98 | −3.0 | 85 |
| No. 9 (Comp. Ex.) | 240 | 0.69 | 43 | −12.5 | 43 |
| No. 10 (Comp. Ex.) | 190 | 0.65 | 38 | −14.8 | 60 |

What is claimed is:

1. A magnetic powder which is manufactured by milling a ribbon-shaped magnetic material which has been obtained by colliding a molten alloy of a magnetic material to a circumferential surface of a rotating cooling roll so as to cool and then solidify it, comprising:

a plurality of particles, each particle including:

an average particle size D$\mu$m in the range of 10–20 $\mu$m;

a plurality of ridges and recesses, each ridge and recess having an average pitch in the range of 3–50 $\mu$m, a length of D/30 $\mu$m and an average depth or height in the range of 0.3–$\mu$m; and a composite structure composed of a hard magnetic phase and a soft magnetic phase, each of the hard and soft magnetic phases having an average crystal grain size in the range of 1–100 mn;

wherein the cooling roll is formed with gas flow passages as gas expelling means defined by a plurality of grooves for expelling gas entered between the circumferential surface and a puddle of the molten alloy in the circumferential surface thereof, a width of the grooves preventing the molten alloy from fully entering the grooves; and when an average pitch of these gas flow passages is defined as P$\mu$m and the average particle size of the magnetic powder is defined as D$\mu$m, a relationship represented by a formula $P<D$ is satisfied.

2. The magnetic powder which is manufactured according to the manufacturing method as defined in claim 1.

3. The magnetic powder as claimed in claim 2, wherein a ratio of an area of a portion of the particle where the ridges or recesses are formed with respect to a total surface area of the particle is equal to or greater than 15%.

4. The magnetic powder as claimed in claim 1, wherein the magnetic powder is subjected to at least one heat treatment during or after the manufacturing process thereof.

5. A bonded magnet which is manufactured by binding the magnetic powder defined in claim 1 with a binding resin.

6. A bonded magnet which is manufactured by binding the magnetic powder defined in claim 2, with a binding resin, wherein the binding resin enters between the ridges or into the recesses.

7. The bonded magnet as claimed in claim 5, wherein the bonded magnet is manufactured by a warm molding.

8. The bonded magnet as claimed in claim 5, wherein an intrinsic coercive force ($H_{CJ}$) of the bonded magnet at room temperature lies within a range of 320–1200 kA/m.

9. The bonded magnet as claimed in claim 5, wherein a maximum magnetic energy product $(BH)_{max}$ of the bonded magnet is equal to or greater than 40 $kJ/m^3$.

10. The bonded magnet as claimed in claim 5, wherein a content of the magnet powder contained in the bonded magnet is in a range of 75 to 99.5 wt %.

11. The bonded magnet as claimed in claim 5, wherein a mechanical strength of the bonded magnet which is measured by the shear strength of the bonded magnet which is measured by the shear strength of a punching-out test is equal to or greater than 50 MPa.

12. A magnetic powder comprising:

a plurality of particles, each particle including:

an average particle size D$\mu$m in the range of 10–20 $\mu$m;

a plurality of ridges and recesses, each ridge and recess having an average pitch in the range of 3–50 $\mu$m;, a length of D/30 $\mu$m, and an average depth or height in the range of 0.3–5 $\mu$m; and a composite structure composed of a hard magnetic phase and a soft magnetic phase, each of the hard and soft magnetic phases having an average crystal grain size in the range of 1–100 $\mu$m.

* * * * *

UNITED STATES PATENT AND TRADEMARK OFFICE

CERTIFICATE OF CORRECTION

PATENT NO. : 6,872,326 B2 
APPLICATION NO. : 10/373973
DATED : March 29, 2005
INVENTOR(S) : Akira Arai and Hiroshi Kato It is certified that error appears in the above-identified patent and that said Letters Patent is hereby corrected as shown below:

| | |
|---|---|
| Column 4, Line 32: | "f or" should be --for-- |
| Column 5, Line 26: | "Other" should be --Another-- |
| Column 5, Line 31: | "other" should be --another-- |
| Column 5, Line 56: | "powered" should be --powder-- |
| Column 6, Line 15: | "across" should be --a cross-- |
| Column 6, Line 62: | "other" should be --another-- |
| Column 6, Line 66: | After "used" insert --in-- |
| Column 8, Line 3: | "$80W\cdot m^{-1}K^{-1}$" should be --$80W\cdot m^{-1}\cdot K^{-1}$-- |
| Column 8, Line 5: | "$60W\cdot m^{-1}K^{-1}$" should be --$60W\cdot m^{-1}\cdot K^{-1}$-- |
| Column 8, Lines 55-56: | "18 [$x10^{-6}K^{-1}$]" should be --18 [$x10^{-6}K^{-1}$]-- |
| Column 10, Line 1: | "elecroless" should be --electroless-- |
| Column 11, Line 21: | "That" should be --than-- |
| Column 11, Line 22: | Delete "an" |
| Column 13, Line 32: | "hereinbelows" should be --hereinbelow-- |
| Column 13, Line 48: | "method" should be --methods-- |
| Column 14, Line 9: | "meal" should be --metal-- |
| Column 14, Lines 9-10: | ""a Sm-Co" should be --as "Sm-Co-- |
| Column 14, Line 21: | "meal" should be --metal-- |

UNITED STATES PATENT AND TRADEMARK OFFICE

CERTIFICATE OF CORRECTION

PATENT NO. : 6,872,326 B2 
APPLICATION NO. : 10/373973
DATED : March 29, 2005
INVENTOR(S) : Akira Arai and Hiroshi Kato It is certified that error appears in the above-identified patent and that said Letters Patent is hereby corrected as shown below:

| | |
|---|---|
| Column 16, Line 48: | "had" should be --hand-- |
| Column 17, Line 40: | "biding" should be --binding-- |
| Column 18, Line 52: | "$1x10^{31\ 1}$" should be --$1x10^{-1}$-- |
| Column 19, Line 51: | "recessesor (gaps)" should be --recesses (or gaps-- |
| Column 20, Line 17: | "rage" should be --range-- |
| Column 20, Line 18: | "biding" should be --binding-- |
| Column 22, Line 62: | "bondedmagnet" should be --bonded magnet-- |
| Column 23, Line 56: | "bondedmagnet" should be --bonded magnet-- |
| Column 23, Line 65: | "50 kJ/m3" should be --50 $kJ/m^3$-- |
| Column 24, Line 48: | "entire" should be --entirety-- |
| Column 26, Line 35: | Delete 2nd occurrence of "the" |
| Column 26, Line 61: | "CO" should be --Co-- |
| Column 27, Line 50: | After "grooves" insert --are spirally formed with a triangular cross-section.-- |
| Column 28, Lines 59-60: | "$29.4W \cdot m^{-}1 \cdot K^{-1}$" should be --$29.4W \cdot m^{-1} \cdot K^{-1}$-- |
| Column 28, Lines 61-62: | "$9.3x10^{-}6K^{-1}$" should be --$9.3x10^{-6}K^{-1}$-- |
| Column 29, Lines 47-48: | "$25.2W \cdot m^{-}1K^{-1}$" should be --$25.2W \cdot m^{-1} \cdot K^{-1}$-- |
| Column 29, Lines 49-50: | "$8.\ 0x10^{-}6K^{-1}$" should be --$8.\ 0x10^{-6}K^{-1}$-- |

UNITED STATES PATENT AND TRADEMARK OFFICE

CERTIFICATE OF CORRECTION

PATENT NO. : 6,872,326 B2
APPLICATION NO. : 10/373973
DATED : March 29, 2005
INVENTOR(S) : Akira Arai and Hiroshi Kato It is certified that error appears in the above-identified patent and that said Letters Patent is hereby corrected as shown below:

Column 30, Line 9: "$20.6W \cdot m^{-1}K^{-1}$" should be --$20.6W \cdot m^{-1} \cdot K^{-1}$--

Column 31, Line 16: "call" should be --called--

Column 31, Line 46: "apart" should be --a part--

Column 34, Line 42: "manufacturing" should be --manufactured--

Column 35, Lines 66-67: "cane be obtain" should be --can be obtained--

Table 2, Line 4 [in Column 36]: "Precesses" should be --Recesses--

Column 37, Line 20: "Ross" should be --Loss--

Column 37, Line 29: "3'2.0" should be -- -2.0--

Column 37, Line 51: "0.3-$\mu m$" should be --0.3–5$\mu m$--

Column 37, Line 55: "100 mn" should be --100 nm--

Column 38, Line 53: "100 $\mu m$" should be --100 nm--

Signed and Sealed this

Fourteenth Day of October, 2008

JON W. DUDAS
*Director of the United States Patent and Trademark Office*